(12) United States Patent
Lem et al.

(10) Patent No.: US 6,466,828 B1
(45) Date of Patent: *Oct. 15, 2002

(54) DEVICE CONTROLLER WITH INTRACONTROLLER COMMUNICATION CAPABILITY, CONVEYING SYSTEM USING SUCH CONTROLLERS FOR CONTROLLING CONVEYING SECTIONS AND METHODS RELATED THERETO

(75) Inventors: Hans J. Lem, Franklin Lakes, NJ (US); Richard J. Bowman, Levittown, PA (US)

(73) Assignee: Quantum Conveyor Systems, Inc., Northvale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/388,980

(22) Filed: Sep. 2, 1999

Related U.S. Application Data

(63) Continuation of application No. 08/752,587, filed on Nov. 21, 1996, now Pat. No. 5,984,498.

(51) Int. Cl.[7] .............................................. G05B 11/01
(52) U.S. Cl. ......................... 700/19; 700/20; 700/112; 700/2; 700/23; 700/169; 198/570; 198/349.6; 198/349.9; 198/349; 29/33 P; 29/783; 712/16; 712/18; 712/245; 712/247
(58) Field of Search ........................... 700/2, 3, 23, 18, 700/19, 20, 112–115, 228–230, 463.3, 169, 214; 198/349.06–349.09, 570, 370.09, 591, 349; 29/33 P, 33 Q, 784, 783, 785; 712/16–18, 245–248

(56) References Cited

U.S. PATENT DOCUMENTS

| | | | | |
|---|---|---|---|---|
| 4,249,661 A | * | 2/1981 | Lem ............................ | 209/564 |
| 4,413,724 A | | 11/1983 | Fellner ........................ | 198/599 |
| 4,511,030 A | | 4/1985 | Lem ............................ | 198/663 |
| 4,574,284 A | * | 3/1986 | Feldman et al. ........ | 340/825.52 |
| 4,688,166 A | | 8/1987 | Schneider ................... | 700/19 |
| 4,696,386 A | | 9/1987 | Lem ........................... | 198/372 |
| 4,876,664 A | | 10/1989 | Bittorf et al. ................ | 700/19 |
| 4,896,256 A | | 1/1990 | Roberts ...................... | 700/245 |
| 4,901,232 A | * | 2/1990 | Harrington et al. ........... | 700/19 |
| 5,031,091 A | * | 7/1991 | Wakatsuki et al. ............ | 700/19 |
| 5,131,081 A | | 7/1992 | MacKenna et al. ............ | 700/2 |
| 5,399,531 A | | 3/1995 | Wu ............................. | 700/19 |
| 5,676,237 A | * | 10/1997 | Lem ........................ | 198/502.2 |
| 6,085,892 A | * | 7/2000 | Lem et al. ............. | 198/370.09 |

OTHER PUBLICATIONS

Copy of EPO Search Report dated Sep. 11, 2001.

* cited by examiner

Primary Examiner—Ramesh Patel
(74) Attorney, Agent, or Firm—Edwards & Angell, LLP; William J. Daley, Jr. Esq.; Peter J. Manus, Esq.

(57) ABSTRACT

Featured is a device controller in a system having a multiplicity of such controllers and a conveying system and method for controlling a multiplicity of devices using such controllers. Each controller includes a plurality of bi-directional communications ports, a processor that processes information and provides outputs, where at least one output controls the device, and an applications program for execution within the processor that includes instructions and criteria for processing the information and providing the processor outputs. Specifically, the applications program includes instructions and criteria for communicating information between and among controllers; instructions and criteria for processing information received by a controller; and instructions and criteria for modifying the operation of a device responsive to the communicated information. For a conveying system having a multiplicity of conveying sections, a controller is provided for each section. Preferably, the applications program for a conveying system controller also includes the instructions and criteria needed to operate any one of a number of different conveying section types. Further, the conveying system controller includes a memory for storing parameters that are used so the corresponding conveying system section operates in the desired fashion.

20 Claims, 13 Drawing Sheets

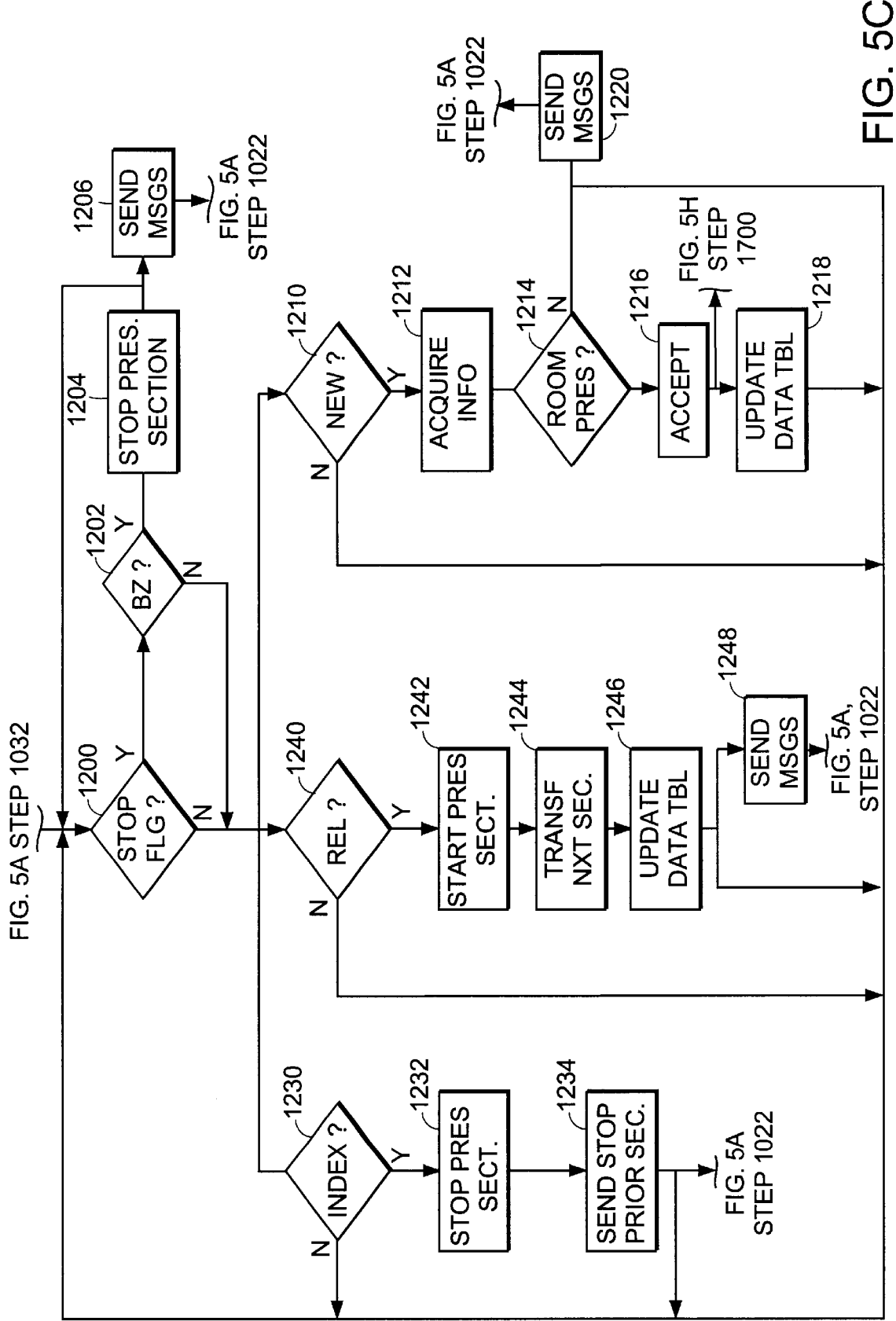

FIG. 5E

DEVICE CONTROLLER WITH INTRACONTROLLER COMMUNICATION CAPABILITY, CONVEYING SYSTEM USING SUCH CONTROLLERS FOR CONTROLLING CONVEYING SECTIONS AND METHODS RELATED THERETO

This application is a continuation of U.S. application Ser. No. 08/752,587, filed Nov. 21, 1996, now U.S. Pat. No. 5,984,498, allowed, the teachings of which are incorporated herein by reference.

FIELD OF INVENTION

The present invention relates to device controllers and operating methods therefor and more particularly conveying systems employing such controllers locally.

BACKGROUND OF THE INVENTION

Existing control systems and control methodologies, particularly those for conveying systems, employ some form of centralized control over multiple device controllers. For example, two device controllers are hard wired interconnected to a programmable logic controller (PLC) or a plurality of PLCs, each being hardwired to device controllers, are hard wired connected to another central PLC. To effect a change in the operation of one device in response to changing conditions for another device, the PLC identifies the changing conditions and sends a signal to the other controller.

Such systems are difficult to modify in the field by the user (i.e, not user friendly). System modifications typically involves re-configuring or replacing each control component (i..e, controller and PLC) in the system. As such, these types of systems are expensive and time consuming and have little flexibility for field modification.

Conveying systems traditionally have been custom designed with centralized controls and complex customized software for tracking articles or goods in movement in the system. Modifications to such systems entail adjustments to the centralized controls, revision to the customized software and the de-bugging required following such changes to assure proper system operation. Further, because the software and controls for each system is customized for each system, it is difficult to combine the control logic with the mechanicals of the conveying system.

There is, therefore, a need for controllers that communicate with each other on a local area basis to control the operation of systems or devices connected to the controllers and need for controllers that de-centralize these control function. Additionally, there is a need for a controllers which do not require hard wired interconnections but use communication protocols and equipment as a means for communicating between controllers. There also is a need for a conveying system that has increased flexibility and controls the flow of goods or articles through the system without centralized control and customized software. Moreover, there-is a need for a conveying system that is modularized in design and operation so customized engineering is not required.

SUMMARY OF THE INVENTION

It is, therefore, an object of the present invention to provide a controller that, through communication with other controllers, controls the system or devices using the controllers.

It is another object of the present invention to provide a controller that de-centralizes the control process.

It is a further object of the present invention to provide a conveying system using such a controller that controls individual sections of the conveying system.

It is yet a another object of the present invention to provide a conveying system controller that adjusts the operation of one conveying section in response to communications from other controllers representative of local system performance or problems.

It is yet a further object of the present invention to provide a conveying system controller, a universal controller, that is re-configurable by the user to drive any of the conveying sections making up the conveying system.

It is still yet another object of the present invention for the controller to be re-programmed by the user locally or from a central location using the controller communications network.

The instant invention features a device controller that is used in a system of such controllers as well as a method for controlling the operation of a device using such a device controller. The device controller includes at least one, preferably at least two, bi-directional inflow and outflow communications ports, a processor and an applications program for execution with the processor. The processor processes information and provides outputs, where at least one output controls the device. The applications program includes instructions and criteria for processing the information and providing the processor outputs. Specifically, the applications program includes instructions and criteria for communicating information between and among controllers; instructions and criteria for processing information received by a controller; and instructions and criteria for modifying the operation of a device responsive to the communicated information.

The device controller further includes a read/write memory for storing data and parameters that control the operation of the applications program. The applications program also further includes instructions and criteria for controlling data storage in the read/write memory as well as instructions and criteria for real time tracking of data related to system performance.

To communicate information between and among the controllers of the system, a communications link is established between each pair of controllers. This link is established by electrically interconnecting one bi-directional outflow port of one controller to one bi-directional inflow port of another controller.

The controller of the instant invention may be programmed or re-programmed by means of the RS232 I/O port or by means of the communications network established by the electrically interconnected controllers. To effect programming/re-programming of a controller via the communications links, the applications program further includes instructions and criteria for reprogramming the processor/controller responsive to instructions and information communicated through a bi-directional inflow port.

Also featured is a conveying system having a multiplicity of conveying sections, where each section is provided with a local controller. The local controller for each conveying section, the corresponding conveying section includes at least one, preferably at least two, bi-directional inflow and outflow communications ports, a processor and an applications program for execution with the processor.

The processor processes information and provides outputs, where at least one output controls the corresponding conveying section. The applications program includes instructions and criteria for processing the information and providing the processor outputs. Specifically, the applications program includes: instructions and criteria for communicating information among and between each controllers of the multiplicity of conveying sections; instructions and criteria for processing information received by the controller for the corresponding conveying section; instructions and criteria to control the normal operation of the corresponding conveying section, and instructions and criteria for modifying the operation of the corresponding conveying section responsive to information communicated from the controller of another conveying section.

Each conveying section controller further includes a read/write memory for storing data and parameters that control the operation of the applications program. The applications program also further includes instructions and criteria for controlling data storage in the read/write memory.

A conveying system according to the instant invention utilizes a multiplicity of different section types to transport articles in a controlled manner. For example, the conveying system of the instant invention may include straight sections, accumulation sections, spacer sections, index sections, diverter sections and merge sections. As such, the applications program in each conveying section controller, preferably includes the instruction and criteria to control the operation of any of these different section types.

The applications program accesses the control routines of the specific to the operation of a given type of conveying section (e.g., an index section) by evaluating the data and configuration parameters stored in the read/write memory. For example, the section type is a parameter that is stored in a data table set up in the read/write memory.

In operation, data relating to the articles on the corresponding conveying section is stored in the read/write memory. The applications program also further includes instructions and criteria for real time tracking of articles on each conveying section. Thus, a remotely located host computer, using the communications network established between and among the controllers, can make an inquiry to any controller for such real time information. Further, when articles are transferred from an upstream conveying section to a downstream section, the data stored in the read/write memory of the upstream controller is communicated to the downstream controller.

In specific embodiments, the conveying system further includes a multiplicity of tracking devices to sense the presence of an article. These tracking devices are disposed at the end or beginning of a given section and the section's controller is appropriately configured for the position of its tracking device. The tracking devices are disposed at various locations through out the conveying system required for proper operation of a conveying section(s) and the system. For example, a tracking device would be located between the end of a spacer section and the next section in the conveying system.

For the first section of the conveying system, a mechanism or device is provided at or proximate the beginning of the first section to provide a positive indication of each article entering into the conveying system. This mechanism or device may be a tracking device, a photo eye or other device known to those in the art for use in detecting the presence of an article. The controller of the first section in response to signals from the mechanism/device assigns a identifier to the article and causes the identifier to be stored in the read/write memory.

A tracking device also is located between the first and second sections, and it is used to determine the length of the articles passing through the first section as well as the presence of the article at the end of the first section. The first and second sections controller operates in conjunction with their tracking device, so the determined length for each article is stored, along with the associated identifier in the read/write memory. Alternatively, the length is determined by the tracking device disposed at the beginning of the first section and the first section controller causes both the identifier and determined length to be stored in the read/write memory.

Similar to the above described device controller, a communications link is established between each pair of controllers of the conveying system by electrically interconnecting one bi-directional outflow port of one conveying section controller to one bi-directional inflow port of another conveying section controller. Further, the conveying system controllers may be programmed or re-programmed by means of the RS232 I/O port or by means of the communications network established by the electrically interconnected controllers and the instructions and criteria included in the applications program.

BRIEF DESCRIPTION OF THE DRAWING

For a fuller understanding of the nature and desired objects of the present invention, reference should be made to the following detailed description taken in conjunction with the accompanying drawing figures wherein like reference character denote corresponding parts throughout the several views and wherein:

FIGS. 5A–I is a flow diagram of the control logic for a universal controller of a conveying section.

DESCRIPTION OF THE PREFERRED EMBODIMENT

Figure 1:
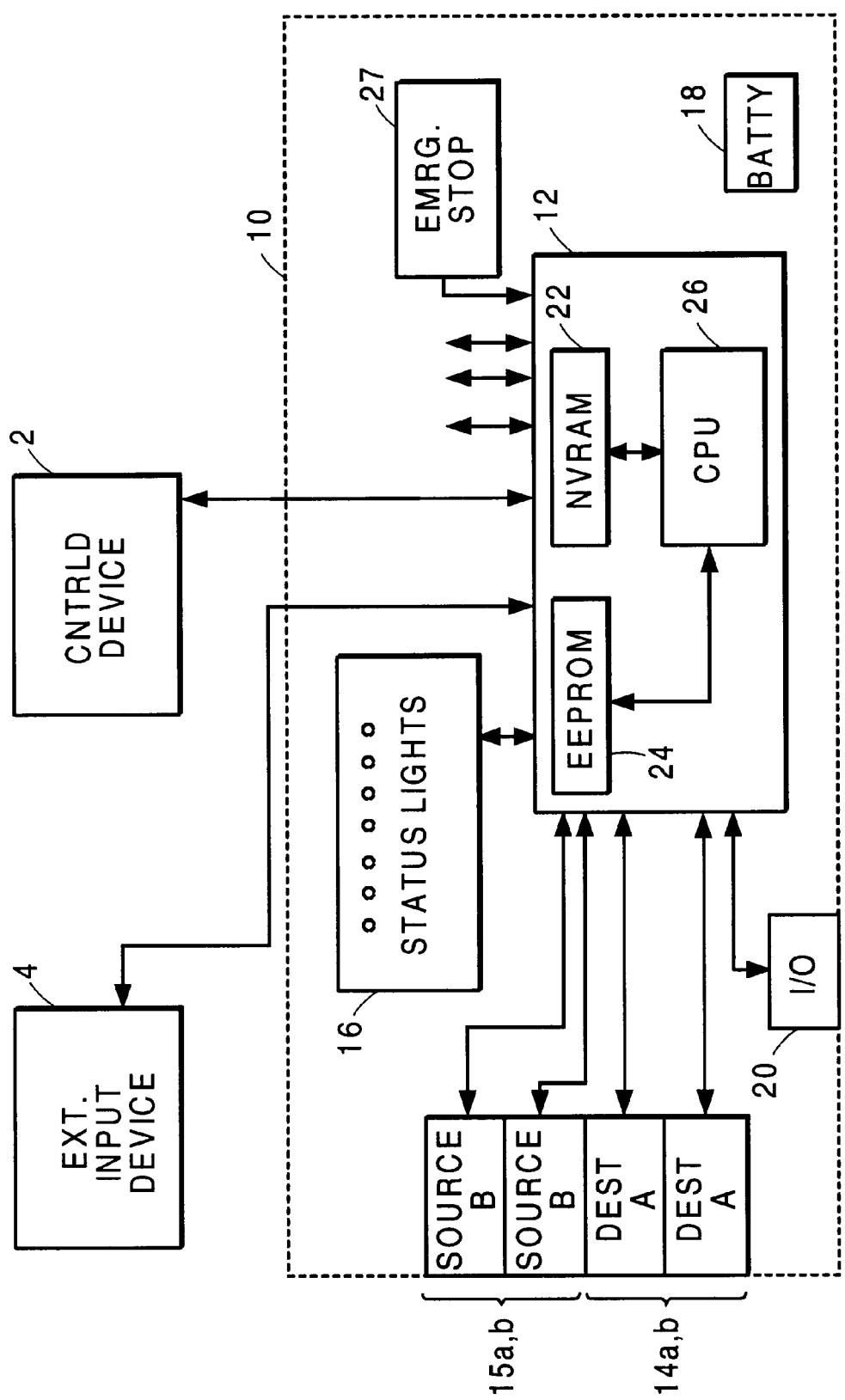
FIG. 1 is a schematic block diagram of a controller according to the instant invention.

Referring now to the various figures of the drawing wherein like reference characters refer to like parts, there is shown in FIG. 1 a schematic block diagram of a controller 10 of the instant invention that controls an external device 2 and which can receive input from an external device 4, such as the tracking signal generating device 122 (FIG. 3) described hereinafter.

The controller 10 of the instant invention, as described hereinafter, is user friendly and easily modified by factory personnel or the users in the field. Instead of one central processor following highly complicated instructions, as is done in prior art systems, each controller 10 provides for local area control over the devices and system.

Preferably, each controller 10 of a conveying system is preprogrammed with the control routines for all the individual conveying system modules or sections so the controller 10 is a universal controller. In operation, configuration parameters are programmed and stored in the processor 12 so as to enable the specific control routines required to operate a conveying section as a particular section type (e.g., indexing section). In addition, to controlling the operation of each section, the controller 10 tracks the position of the boxes, goods or articles on each section of the conveying system and can direct the final destination of specific boxes. articles, etc. That is, at any time each controller 10 in the conveying system is being operated so the identity of each box/article on each section is retrievable by the controller.

Figure 2:
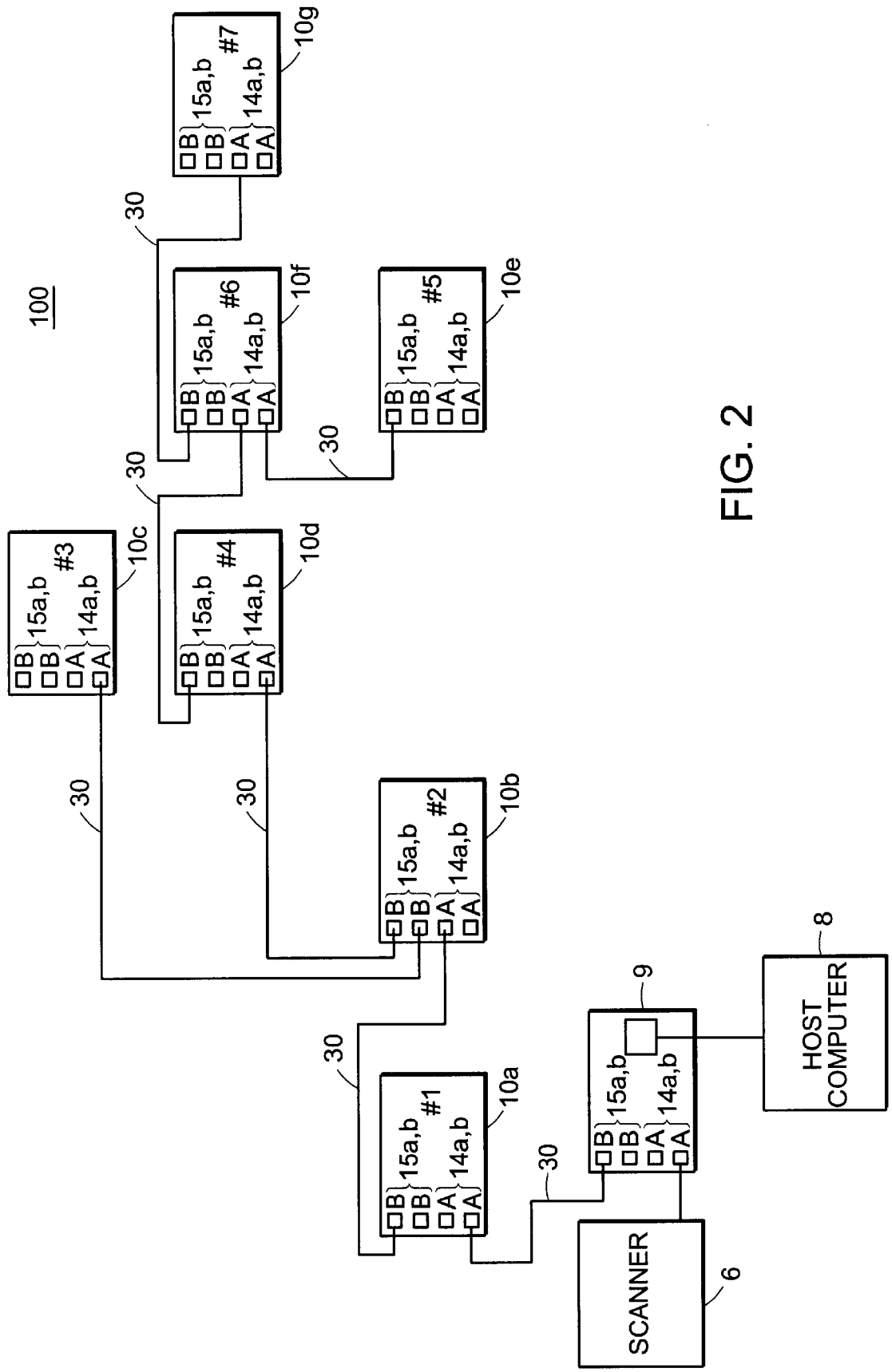
FIG. 2 is a block diagram of an exemplary communications network for controllers of the instant invention.

The controller 10 includes a processor 12, status lights 16, a battery 18 and an RS232 I/O port 20. Also included is at least one and preferably two inflow bi-directional communications ports 14*a,b* and at least one and preferably two outflow bi-directional communications ports 15*a,b*. The bi-directional communications ports 14*a,b;* 15*a,b* are preferably RS485 connectors with two RJ31X modular connections. The individual controllers 10 are interconnected to each other for bi-directional communications therebetween by means of a twisted eight wire telephone type cable 30 (FIG. 2).

The controller 10 is powered in any of a number of ways. In one embodiment, electrical power is supplied to the controller via the twisted cable 30 (FIG. 2) interconnecting the communications ports 14*a,b;* 15*a,b* of each controller. Thus, each of the controllers 10 is powered from a central source. The central power supply provides power in the range of from about 20 Vac to about 52 Vac and preferably is about 24 Vac or about 48 Vac. Alternatively, each controller 10 or a group of controllers are connected to a power supply in the above voltage ranges.

The battery 18 is a 3 V Lithium coin cell or any long-life type of battery known in the art. The battery 18 supplies backs up power to the read/write memory 22 comprising the controller 10 in the event of a power failure so data is retained until power is restored. For a conveying system application, the information retained includes the article tracking information and configuration parameters for each section. Also included is information concerning the articles or boxes on the section and any sorting or routing instructions for these articles/boxes. Alternatively, or in addition to the battery 18, the controller may use nonvolatile memory types that retain information when there is a power failure.

The status lights 16 are a plurality of LED indicators that are intended to help a user troubleshoot the controller 10. The status lights also provide a visual indication of the status of the controller's operation and outputs from the relays and TRIACS of the controller. The lights may flash slowly, flash rapidly or may be lit steadily. For example, the status lights representative of a controller's operability may be lit continuously when the controller 10 is locked up whereas they flash at some rate during normal operation.

The RS232 I/O port 20 provides a bi-directional communications interface between the processor 12, including the EEPROM 24 and NVRAM 22, and an external device such as programming terminal or a computer such as an personal computer. The I/O port 20 is one means for inputting the parameters required to configure or re-configure a given controller. As described below, the controller(s) also may be configured/re-configured by a centrally located computer that communicates to each controller using the controller communications network 100 (FIG. 2).

The processor 12 preferably includes a non-volatile random access memory (NVRAM) 22, an EEPROM 24 and a central processing unit 26. The applications program or software routines, hereinafter described in connection with FIGS. 5A–I, are preferably stored on the EEPROM 24 which is easily removed in the field for replacement. The configuration parameters preferably are stored in the NVRAM 22 so they are easily changed in the field, particularly by the user.

To update the applications program for any of the conveying sections of a conveying system according to the instant application, an EEPROM is programmed in the factory and sent out to the field for installation. Because of the modularity of the conveying system sections and the interactive communications between controllers during system operation, further debugging prior to full system operation is not required for the instant invention. This saves time and money in comparison to known systems that are customized for a given application which limits the ability to factory test or validate the applications program prior to installation.

The NVRAM 22 stores data and any parameters required for the operation and/or configuration of each controller 10. For example, in a conveying system application, data regarding the boxes or articles on a section and any related tracking and routing data for each of these boxes or articles is stored in the NVRAM. Further, the configuration parameters required to enable the control routines for a given section type of a conveying system are also stored therein.

The central processing unit 26 preferably is a PIC17C43 by MicroChip Corp., and alternatively it may be PIC17C44 by MicroChip Corp. The software routines stored in the EEPROM 24 are loaded into the central processing unit 26 and specific routines are enabled by means of the configuration parameters retrieved from the NVRAM 22. The central processing unit 26 executes the program and routines therein so as to control the device 2. For example, in a conveying system the central processing unit 26 outputs signals to control a given conveying system section and thereby control the flow of boxes or articles (i.e., product) through the section and in the system. Also, the central processing unit 26 would direct information to be retrievably stored in the NVRAM 22 concerning an article or box on the section.

As noted above, the controllers 10 of the instant invention are interconnected to each other for communications by appropriately interconnecting the inflow and outflow bi-directional communications ports 14*a,b;* 15*a,b* of at least two controllers. There is shown in FIG. 2 a block diagram of an exemplary communications network 100 for a plurality of controllers 10*a–g*.

The controllers 10*a–g* preferably are connected to each other using a "daisy chain" topology. Starting from the upstream most point, the first controller 10*a,* a connecting cable 30 is interconnected to an outflow bi-directional communications port 15*a* of the first controller 10*a* and into an inflow bi-directional communications port 14*a* of the second controller 10*b.* Thus, a bi-directional communications link is established between the first and second controllers 10*a,b* for the communication of data and information therebetween. In a similar fashion, there is established a communications link between the sixth and seventh controllers 10*f,g.*

In some situations, information and data flow is split between two downstream paths such as that shown for the second, third and fourth controllers 10*b–d.* For example, when goods or boxes are diverted from one line into one of two lines in a conveying system. Again starting with the upstream controller, the second controller 10*b,* two connecting cables 30 are connected to the outflow bi-directional communications ports 15*a,b* of the second controller 10*b.* The other end of one connecting cable 30 is connected to an inflow bi-directional communications port 14*a* of the third second controller 10c and the other connecting cable is connected to an inflow bi-directional communications port 14a of the fourth controller 10d. Thus, a bi-directional communications link is established between the second and third controller 10b,c and the second and fourth controllers 10b,d for the communication of data and information therebetween.

In some situations, information and data flow from two upstream paths is combined into one downstream path such as that shown for the fourth, fifth and sixth controllers 10d–f. For example, when goods or boxes from two lines of a conveying system are being merged into one line. Again starting with the upstream side, a connecting cable 30 is connected to an outflow bi-directional communications port 15a of the fourth controller 10d and connected to one inflow bi-directional communications port 14a of the sixth controller 10f. Similarly, a connecting cable 30 is connected to an outflow bi-directional communications port 15a of the fifth controller 10e and connected to the other inflow bi-directional communications port 14b of the sixth controller 10f. Thus, a bi-directional communications link is established respectively between the fourth and sixth controllers 10d,f and the fifth and sixth controllers 10e,f for the communication of data and information therebetween.

In addition, to forward and backward communications between controllers that are directly connected (e.g., the first and second controllers 10a,b), the communications network 100 permits such communication throughout the entire network 100. For example, the seventh controller 10f may communicate with the first controller 10a by means of the communications links established respectively between the first and second controllers 10a,b, the second and fourth controllers 10b,d, the fourth and sixth controllers 10d,f and the sixth and seventh controllers 10f,g. Thus, the communications links not only establish a local communications links between individual controllers but allows establishes communications links between any controller in the network.

Also shown is one means for interconnecting an external device, such as scanner 6 and/or a host computer 8, to the controller communications network 100. The host computer 8 is interconnected to a buffer device 9 which in turn is interconnected to one of an inflow bi-directional communications port 14a of the first controller 10a. Similarly, a scanner 6 may be connected to a communications port of the buffer device 9. The use of a buffer device 9 in connection with the host computer 8 enables forward and backward communication between the controllers 10a–g as well as forward and backwards communications between the host computer and any one or all of the controllers 10a–g of the communications network 100. For example, the host computer 8 using the established communications links could reprogram one or any number of controllers from a central location, even while "on the fly" (e.g., while a conveying system is in operation).

Figure 3:
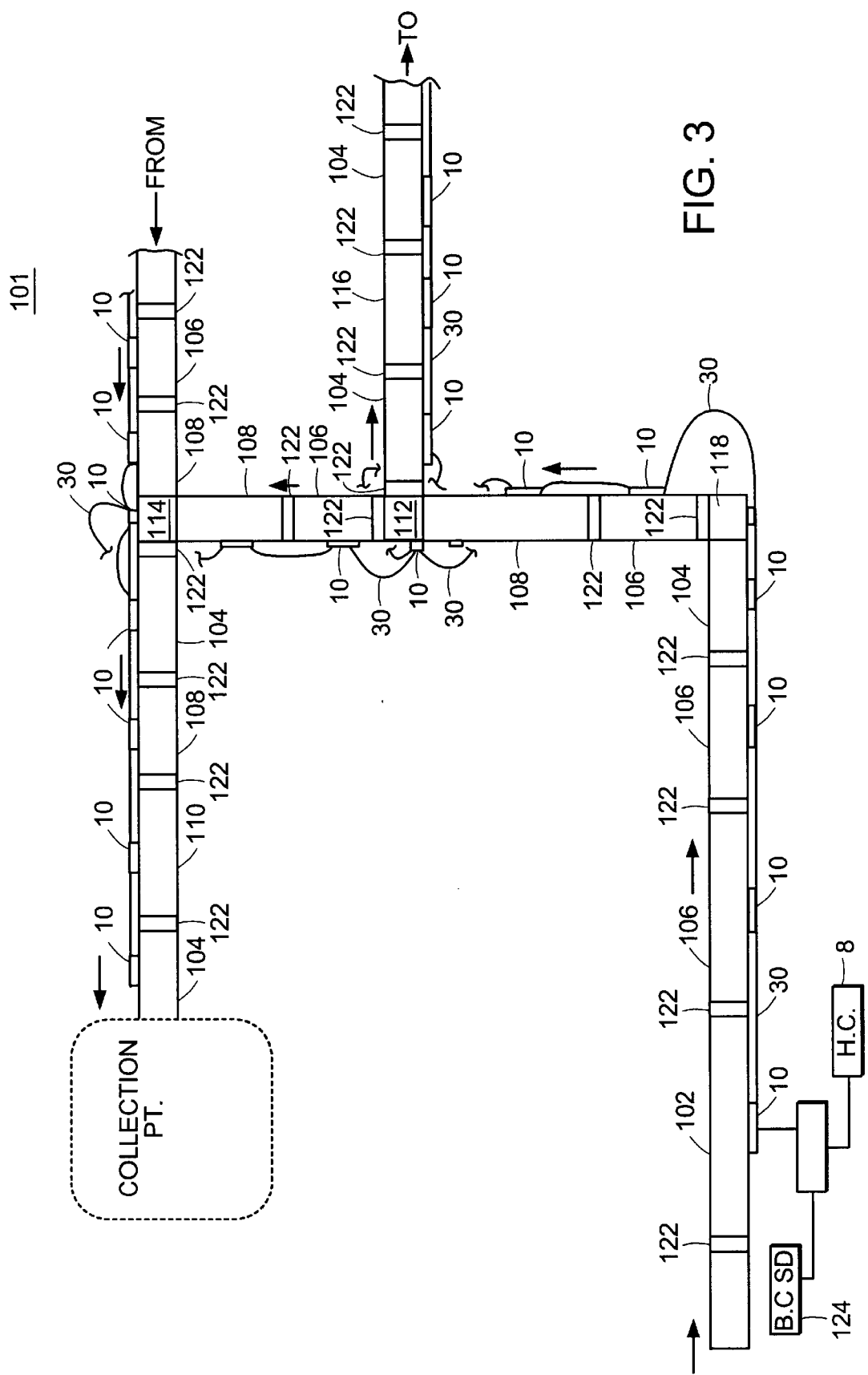
FIG. 3 is a plan view of an exemplary conveying system using the controller of the instant invention.

Now referring to FIG. 3, there is shown a plan view of a portion of an exemplary conveying system 101 including a multiplicity of modular conveying sections. Each of these modular sections, described further below, includes a controller 10 that controls the functions of a given conveying section including the designated task or tasks to be performed for transporting an article, package or box through the system. The controller 10 of each modular conveying section also is given a unique identification number or address so each section is uniquely identifiable.

The illustrated conveying system 101 includes a first section 102, a multiplicity of straight sections 104, a multiplicity of accumulating sections 106, a multiplicity of index sections 108, an incline/decline section 110, a diverter section 112, a merge section 114, a spacer section 116 and a corner section 118. A tracking signal generating device 122 is disposed at the front of selected ones of these sections, however, such devices can be disposed at,the end of selected ones of such sections. Further, an interconnecting cable/twisted wire 30 interconnects each controller 10 thereby establishing a bi-directional communications network for the conveying system 101.

The conveying system 101 also includes a multiplicity of tracking signal generating devices 122, each including a roller mechanism that projects above the nominal surface of the conveying sections and which is depressed by the passage of a package, box or article thereover. The tracking device 122 also includes a sensor that senses the downward motion of the roller mechanism and outputs a signal therefor which indicates the presence of an article/box. The tracking device 122 further includes a sensing mechanism to determine the length of the article or box passing over the roller mechanism. For example, the sensing mechanism detects the fractional and full rotations of the roller mechanism while it is depressed and equates this to a length. Such a device also is described in copending application Ser. No. 08/529,991, the teachings of which are incorporated herein by reference.

The tracking device 122 located in front of the first section 102, determines the length of each package, article or box entering onto the conveying system 101 as well as initiating the tracking process. Other devices may be disposed at or along the first section, or at any other locations through out the system, for acquiring data or information concerning the article. Also, a section following a device may be configured to act responsive to signals from the device. For example, a sensing device(s) may be provided before a diverter section 112 to determine the weight or relative weight of the article and/or the articles overall height, length and width. The diverter section 112 can be configured to act in a prescribed fashion responsive to the signals from this sensing device. Also, for example a scanning device, such as bar code scanner 124 may be positioned to detect and read bar code labels affixed to the article being transported. This information could be used by the host computer 8 to determine the routing of a package or article through the conveying system 101.

The first section 102, each straight section 104, each accumulating section 106, each indexing section 108 and each spacer section 116 include a plurality of elongated pneumatic lifting assemblies or lifters that are interleaved with one or more parallel continuously moving belts on which articles are transported. When there are a multiplicity of sections in series, the belts may be constructed so each belt extends along the entire length of the interconnected sections. For example, the moving belts extend between the first section 102 and the corner unit 118.

The pneumatic lifting assemblies are used to lift the product or articles clear of the continuously moving belts. This stops the flow of the product or articles passing through a given module or section. The stoppage of product or articles also is referred to herein as stopping the section. The specific manner in which the pneumatic lifters function (i.e., raised, lowered, remain down) is dependent upon the function a particular section is intended to perform (e.g., accumulation, indexing). The specific fashion in which each of these sections 102–108, 116 operate are discussed hereinafter in connection with FIGS. 5A–I. Reference should also be made to U.S. Pat. No. 4,511,030, the teachings of which are incorporated herein for reference, for further details regarding such a conveying section or module.

Each of these sections 102–108, 116 also includes a pneumatic system of a low and high pressure supply lines, a control valve, air manifold, air bag, and a lifter cup assembly. The controller 10 for each of these sections 102–108, 116 controls the pneumatics for a given section and thereby control the lifting assembles. In this way, the pneumatic lifters for each section are raised and lowered by the sections's controller as required to perform the sections' function.

The diverter section 112 is configured so that boxes or product can be selectively transferred or re-directed in a direction perpendicular to the direction of the belt line on which the box or product is initially traveling. That is one box may continue on straight ahead while another box may be diverted to another line of the conveying system 101. The corner section 118 is designed so the box or product is always turned 90° with respect to the line of travel. The merge section 114 is designed to allow product or articles flowing from two separate lines to be selectively merged together to flow in a single output line. The specific fashion in which each of these sections 112, 114, 118 function are discussed hereinafter in connection with FIGS. is 5A–I.

The diverter section 112, the merge section 114 and corner section 118 each include an array of wheels or rollers mounted on a frame. The wheels or rollers are arranged so the continuously moving belt(s) pass freely through the array. The wheels or rollers of the diverter section 112 and the merge section 114 are normally disposed beneath the surface of the belts and raised pneumatically when required to change the direction of the moving product or article. The rollers for the corners section 118 are arranged so they always present a contact surface slightly higher than the belts. The orientation and shape of the wheels is adjusted to match the function to be formed. For example, for a merge unit the rollers are orientated across the belt line. Reference also should be made to U.S. Pat. No. 4,696,386, the teachings of which are incorporated herein by reference.

An incline/decline section 110 is provided to deal with situations when it is necessary to have the product or articles travel up or down a gradient or slope because the belt lines of a portion of the system are at different elevations. For example, to provide a local walkway under a conveying system, the surface of the belt line must be raised or elevated locally. One such incline/decline section that transports articles or product up a steep gradient is described in copending application Ser. no. 08/450,006, the teaching of which are incorporated herein by reference.

The conveying system is arranged so indexing sections 108, precede the incline/decline section 110, the diverter section 112 and the merge section 114. Using an indexing section 108 with the diverge and merge sections 112,114 assures that articles or product are spaced from each and that each article or product arrives at a set time on the rollers after release from an index section. The indexing section 108 also avoids the need to provide a separate device, such as photo eye, to actuate the diverge or merge section 112,114. Instead, the controller 10 for the diverge or merge section 112,114 may be configured so the section acts based on the expected arrival time of the product on the rollers.

The overall operation of the conveying system 101, the conveying sections thereof and the controls thereon by the individual controllers 10 is best understood from the following discussion. For purposes of discussion, the conveying system shall be assumed to be the bagging conveying system for an airline. However, it shall be understood that the conveying system is not limited to the either the illustrated system or to just an airline bagging handling systems.

As boxes or baggage are received by the first section 102, a bar code scanner 124 scans each piece of baggage to identify the bar code and thereby the information encoded therein. For, example, the bar code labels would contain information such as the flight number of the departing flight.

The information from the bar code scanner 124 is provided to the host computer 8, which determines the routing through the system for each bag received. When the presence of a bag on a tracking device 122 is detected, the controller for the first section 102 gives a unique identifier (e.g., identification number) to the bag and determines from the tracking device the overall length of the bag. The data table 200 (FIG. 4) for the first section 102 is updated to include the identification number, the length of the baggage as well as the routing information for the bag from the host computer 8.

Each piece of baggage passes through each of the following sections of the conveying system 101, including the corner section 118, until they reach the diverter section 112. As the baggage is past from section to section, the data tables of the respective sections are updated. For the receiving section, the data table is updated to include the information for each bag entering the section. Correspondingly, the data table 200 for the departing section is updated to delete the information for each departing bag. If baggage flow through the section preceding the corner unit 118 is stopped, then baggage will begin to accumulate on the accumulator section(s) 106 preceding the corner unit.

If the baggage is being to be routed based on routing information, a message is sent to the host computer 8 as and when a bag passes through one of the routing addresses identified in the data table 200. Also, when a bag passes through an identified address, this address is deleted from the listing of routing addresses included in the data table.

When the piece of baggage reaches the diverter section 112, its controller 10 determines whether to allow the baggage to continue on or to divert it onto a different path. This determination is made based on the routing information include along with the data table and/or other preset criteria programmed into the controller. For example, if the path a bag is to be directed to is full the diverter would not transfer but would retain the bag on its rollers. As indicated in the foregoing, the preceding index section 108 controls the flow of baggage to the diverter section 112.

If the baggage continues on (i.e., not diverted), the baggage passes through the following sections until it reaches the merge section 114. As described above, the data table for each of these sections is updated as the baggage successively passes through each section. Depending upon the merge criteria (e.g., first come first serve) being used, the appropriate preceding index section 108 is actuated to hold up baggage in one line so baggage from the other line passes to the merge section 114 and onto the next section. If the baggage is coming from the line perpendicular to the travel path through the merge section 114, then the merge section rollers also are raised so the baggage is diverted onto the new travel path.

After passing through the merge section 114, the baggage continues on until it reaches the index section 108 preceding the incline/decline section 110. For purposes of this discussion, the incline/decline section 110 has article engaging lugs affixed to the travel belt. As such, the pieces of baggage are delayed by the index section 108 so each piece of luggage will end up between two sets of lugs on the inclined portion of the incline/decline section 108. The baggage continues to travel on until it reaches the collection point, for example, the arriving baggage carousel within the terminal.

Figure 4:
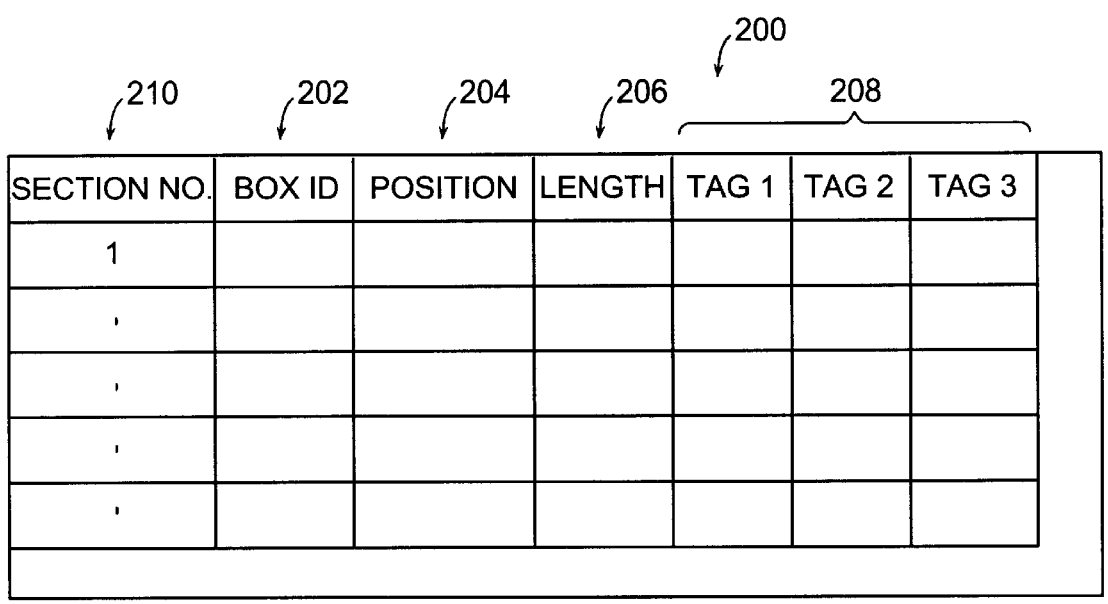
FIG. 4 is an exemplary data table of the information concerning the articles in transit that is stored in each conveying system controller.

As indicated above, data is stored in the NVRAM 22 of each controller concerning each box/article (i.e. product) that is on a given section of a conveying system 101. An exemplary data table 200 for this information is shown in FIG. 4. As illustrated, the data table 200 contains an indication 202 of the identification number assigned to the particular box or article on the section. Further, there is contained a position indication 204, a length indication 206 and routing tags 208 or section addresses for each item on the data table 200. While three route tags or section addresses are illustrated, this is not a limitation as there may any number of routing tags. As also indicated above, the information or data on the data table 200 for each controller 10 of the conveying system 101 is updated as, and when, articles leave and enter a section.

Preferably, the controller 10 for each section includes the control routines for any section type of the conveying system. This simplifies installation and maintenance as well as reduces costs and expenses. For example, there is no need to maintain is stores of controllers/EEPROMS for each section type. A flow chart illustrating the basic operations and steps followed by the communications and control routines of a controller 10 according to the instant invention are shown in FIGS. 5A–I. Reference.also should be made to FIGS. 1–4 for the specific components of the controller 10, conveying system 101 and/or communications network 100 referred to hereinafter.

As provided herein, the specific control routine, that controls the function or operation of a section, is established by the configuration parameters programmed into each controller 10. Further these configuration parameters are under the control of the user and as such are easily changed in the field. The controller 10 for each conveying section is initially programmed with the configuration parameters required so the corresponding conveying section functions as intended. As indicated above, these parameters preferably are stored in the NVRAM 22 so they are not lost if a power failure occurs. The configuration parameter indicates the functional section type (e.g., spacer, index section) as well as other operational parameters, for example, the size of the buffer zone used to control the operation of a conveying section or module.

Each controller 10 is initially configured or re-configured in one of two ways. The host computer 8, using the communications network established between each controller of the conveying system, establishes a communications link with each controller. Using this link, the computer programs in the appropriate is configuration parameters. Alternatively, a terminal or computer is connected to the RS232 I/O port 20 of each controller 10 and each controller is programmed with the initial configuration parameters.

After each controller 10 is initially configured the conveying system is powered up and the transport of product, articles, boxes, through each section of the conveying system is started, step 1000. Thereafter, each controller 10 of a conveying system 101 performs a number of functions in parallel. In particular, each controller 10 evaluates all messages it receives and implements the specific control routine (s) of the applications program so the corresponding conveying sections functions as intended (e.g., functions as an index section). That is, the present section controller performs its communications protocol routines independently of its function specific control routine(s). It should be recognized that while the following may show or des scribe steps or operations in series or in parallel, it is within the scope of the present invention for the steps to be performed in different sequences than that illustrated and described herein.

For purposes of the following discussion the terms present section, prior/previous section(s) and next section(s) are used to distinguish different conveying sections of a portion of the conveying system 101. The present section is any of the sections comprising the conveying system 101, however, in the following the term is generally used to identify the section(s) of a conveying system that perform the specific control routine being described. Prior/previous section(s) is used to identify the section(s) immediately preceding the present section. Next section(s) identifies the section(s) that immediately follow the present section.

When performing its communications or message processing functions, the controller 10 of the present section evaluates all messages being received over the bi-directional communications network 100. Additionally, the present section controller 10 determines if a message being received is for the present section controller or for another controller, step 1002. If the message is not for the present controller (NO) then the message is sent onto the next or previous controller and the process returns to the beginning of the communications control routine, step 1002.

If a received message is for the present section controller (YES, step 1002), then the controller evaluates the message to determine if it is a programming message, step 1004. As noted above, any or all of the controllers 10 of a conveying system 101 may be accessed by the host computer 8 to initially set or to alter the controller's configuration parameters. For example, the configuration parameters may have to be changed when there is change in the physical layout or arrangement of the conveying system. If it is such a message (YES) then the process proceeds to step 1800, FIG. 5I.

If it is not a programming message (NO, step 1004), then the present section controller evaluates the received message to see if it is a stop message/command, step 1006. A stop message or stop command is sent by the next section controller to the present section controller and generally indicates that the next section is stopped. That is, flow of product (e.g., boxes, articles, packages) was stopped in the next section. The stop message from the next section typically is the result of stop messages from the controllers downstream of the next section.

If it is a stop message (YES, step 1006) then the present section controller sets a stop flag, step 1008. The status of the stop flag is evaluated by the function specific control routines, discussed hereinafter, for each section type. In general, these function specific control routines determine when, and if, the flow of product also should be stopped in the present section. After setting the stop flag, the process returns to the beginning of the communications protocol, step 1002.

If it is not a stop message (NO, step 1006), then the present section controller evaluates the message to see if it is an indexing message, step 1010. An indexing message is sent by the next section controller when the next section is not stopped, or is no longer stopped, and thus can accept product from the present section. If it is an indexing message (YES), then the stop flag of the present section is cleared, step 1012 and the process returns to the beginning of the communications protocol, step 1002.

If it is not an indexing message (NO, step 1010), then the present section controller determines if the message received is a data inquiry message, step 1014. The host computer 8, using the bi-directional communications network 100 of the controllers, can send out a message that requests one, all or any combination of controllers to output a data message. If it is a data inquiry message (YES) then the present section determines if a reply is required, step 1015. If a reply is required (YES, step 1015), then the present section controller 10 sends a message to the host computer 8 using the bi-directional communications network of the controllers, steps 1016, 1022.

For example, the host computer 8 could send out an inquiry message to all controllers of the conveying system 101 requesting the location(s) of a specific package(s). The controller 10 for each section would evaluate its data table to determine if the package(s) are located on its section. If yes, the controller would send the appropriate reply back to the host computer 8 via the bi-directional communications network 100. After sending the message, or if no reply is required (NO, step 1015), the process returns to the beginning of the communications protocol, step 1002.

If it is not a data inquiry message, (NO, step 1014), then the controller 10 determines if the received message is an emergency stop message, step 1018. If YES, then the present section is stopped and an emergency stop message is sent to the next and previous sections, steps 1020, 1022. The process then returns to the beginning of the communications protocol, step 1002.

Each controller 10 includes a normally closed switch 27 that can be actuated by an individual to stop the operation of a given section. When this switch is actuated (e.g., opened), the present section controller 10 stops the present section and outputs an emergency stop message to the other sections comprising the conveying system so system operation also is stopped. This is done to protect or minimize injury to others as well as to minimize or avoid damage to the system, system components and/or packages in transit.

As indicated above, the controller 10 when the conveying process is started, step 1000 determines from the configuration parameters the section type for the present section. Specifically, the controller determines if the present section is to be operated as a first or straight section, step 1030; as an indexing section, step 1032; as a diverter section, step 1034; as a merge section, step 1036; as a spacer section, step 1038; or as an accumulation section, step 1040. Thereafter, the present section controller 10 implements the specific control routine(s) applicable for the section type established by the configuration parameters.

The straight, indexing, spacer and accumulating sections 102–108, 116 mechanically are the same conveying section module and differ only in the way in which the control routine operates the conveying section module. As such, these section types can be easily changed from one section type to another (e.g. from straight to accumulating) by changing the appropriate configuration parameters programmed into the controller. Also, the diverter and merge sections 112,114 can be programmed so as to operate in a different fashion by means of changing the configuration parameters. For example, a diverter or merge section 112, 114 can be configured so it passes articles straight through the section (e.g. no diversion) or so the articles always are turned through 90° to the travel path (i.e., section functions as a corner).

This capability allows the user to alter the functional arrangement of a conveying system 101 without requiring hardware changes to individual sections or altering the physical arrangement of the conveying system. Thus, a conveying system of the instant invention can be easily configured to operate temporarily in one fashion and then returned to its normal system functional arrangement simply by reprogramming the configuration parameters of affected controllers.

Figure 5A:
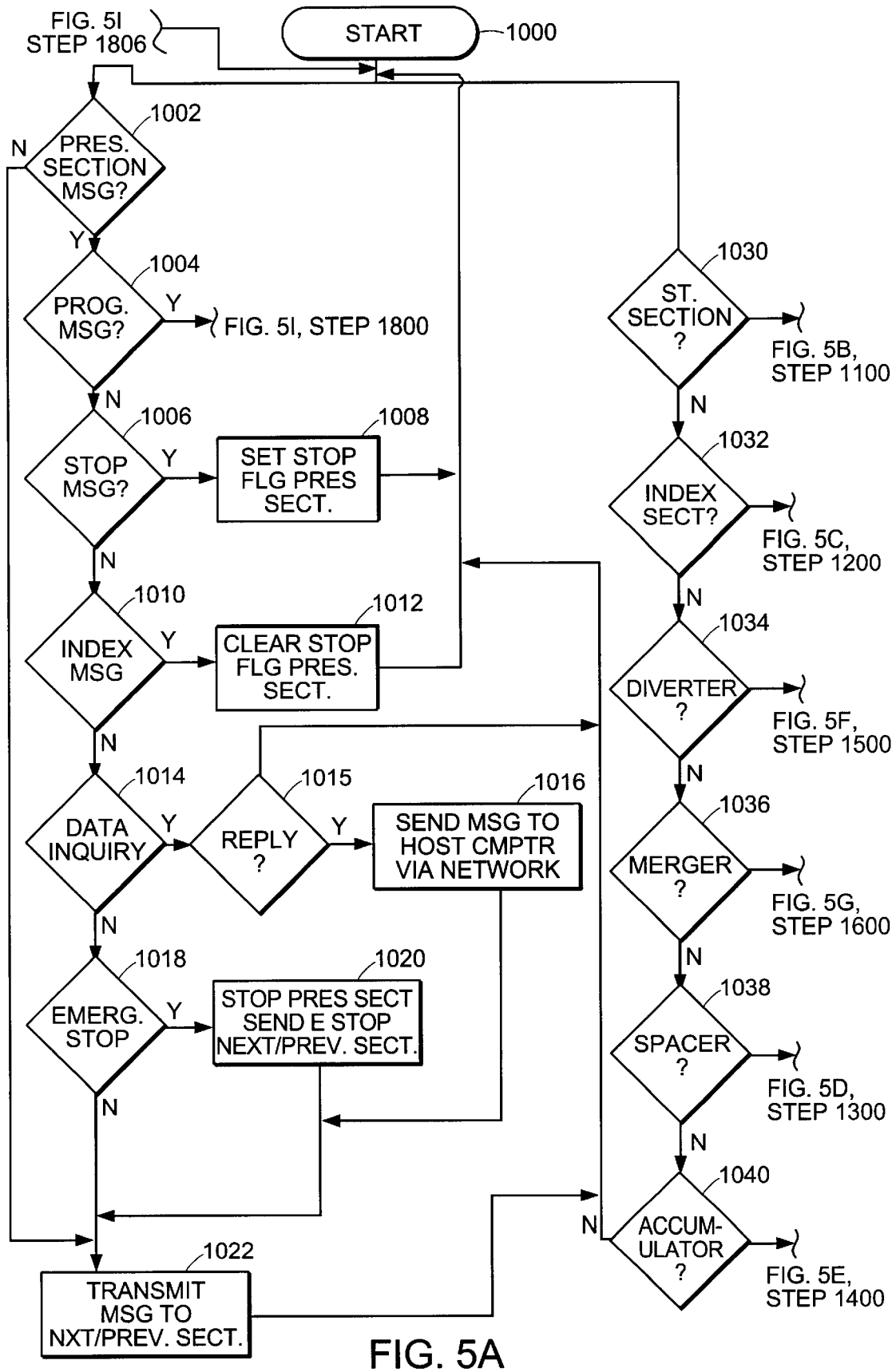
Figure 5B:
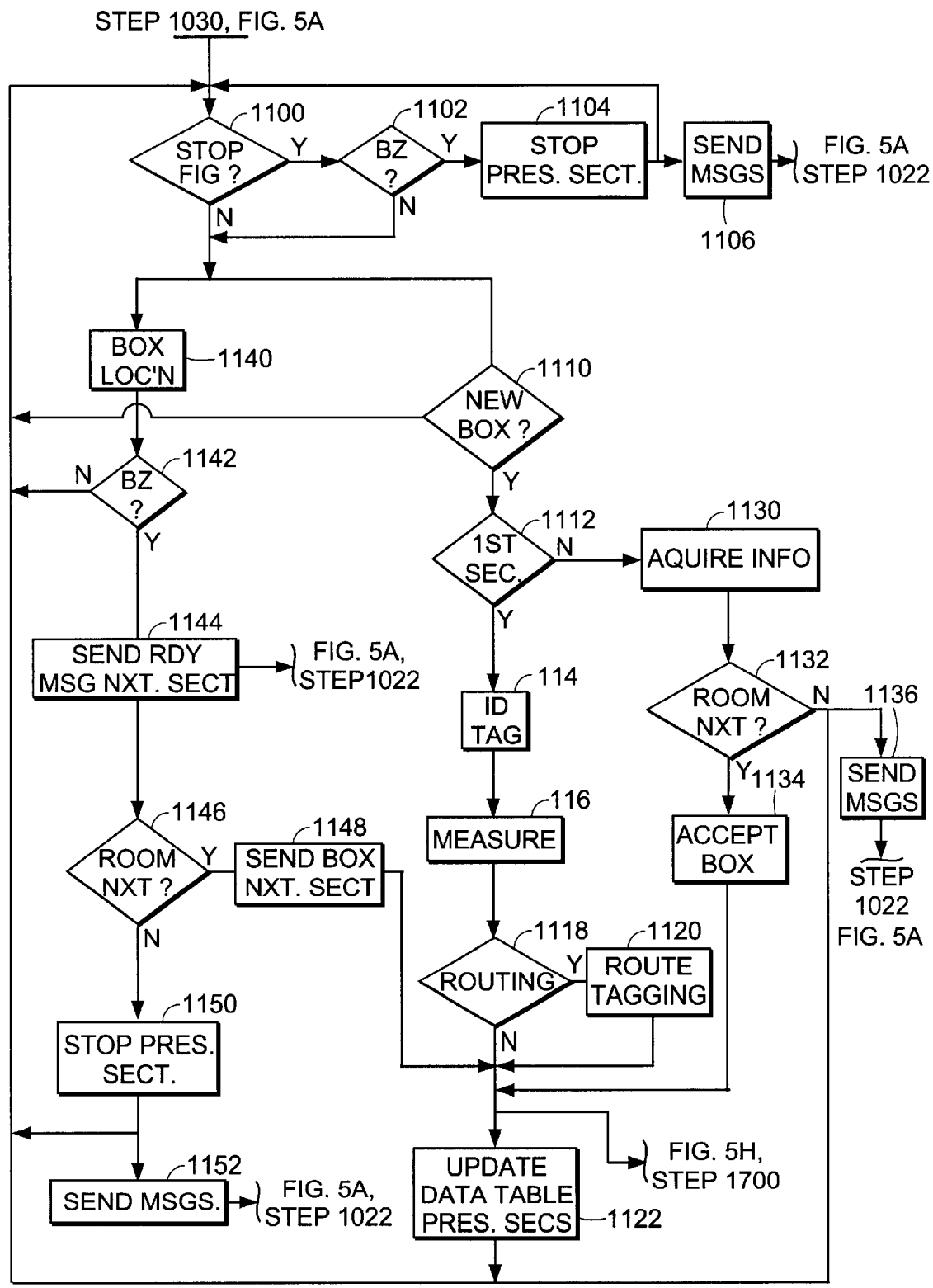

Referring next to FIG. 5B, there is shown the control routine of a controller 10 when configured so a section of the conveying system 101 functions as a straight section 104, (YES, step 1030, FIG. 5A). A straight section 104 is provided in a conveying system 101 so goods received at one end of the section or module are transported to the other end and onto the next section in the system. The section runs continuously, until the section's controller 10 determines that it must be stopped i.e. flow of goods in transit stopped). Further, the controller of the straight section 104 also assures that information of the goods in transit is provided to the next section. A straight section is the first section 102 of the conveying system.

In operation, the present section controller 10 (i.e. the controller for a straight or first section 104,102) determines if the stop flag has been set, step 1100 (FIG. 5B) in response to the receipt of a stop message from another controller (FIG. 5A, steps 1006, 1008). If the stop flag is set (YES), the present section controller 10 evaluates the location of the articles in transit on the present section to determine if there is an article located in the buffer zone at the end of the present section, step 1102. The buffer zone typically is defined so the forward momentum of the article being stopped does not cause the article to pass onto the next section.

If an article is located in the buffer zone (YES), the present section controller stops the present section, step 1104. The present section controller also sends a ready message to the next section controller, step 1106, step 1022 (FIG. 5A). If the present section is not the first section 102, the present section controller also sends a stop message to the prior section, step 1106. The ready message is an indication to the next section that an article is ready to be transferred to the next section. The stop message provides an indication to the prior section that the present section cannot accept any further goods. The controller for the prior section determines if, and under what circumstances, the prior section should be stopped.

If the stop flag is not set (NO, step 1100) or there is no article in the buffer zone when the stop flag is set (NO, step 1102), then the present section controller performs two functions as and when called upon. Specifically, the present section controller controls the entry of goods onto the present section and controls the passage of goods through the present section and onto the next section.

Preferably, the conveying system 101 is configured with a tracking device 122 at the front end of the present section to provide a positive indication of the arrival of goods (e.g., box, article) at the section's front end. When a new article is sensed by the tracking device 122 ( e.g., roller mechanism is depressed), the present section controller detects a new box, article or product, step 1110. If the present section is a first section of a conveying system (YES, step 1112), then the present section controller assigns a unique identification tag or number to the box, step 1114. Using the tracking device 122, or other length measuring means known in the art, the present section controller 10 also determines the length of the new box, step 1116.

As noted above, a conveying system and its controllers also can be configured to route the boxes or articles about the system in a predetermined fashion. Thus, if a box/article is to be routed around the system (YES, step 1118), the host computer 8 provides the desired route tags to the present section controller, step 1120. The route tags generally identify the address of a section at which some action is to be taken relative to routing. For example, when the box arrives at the diverter section corresponding to a specified address or identification number, then the box would be directed to proceed along one of the two outgoing lines according to the routing instructions. After obtaining the routing information (step 1120), or if the box is not to be routed (NO, step 1118), the data table 200 for the present section controller is updated, step 1122 to include the information for the new box/article. This includes the identification number 202, length 206 and, when applicable, the route tags 208. The process then returns to the beginning of the control routine for the present section, namely to determine if the stop flag is set, step 1100. The data table 200 also includes an identifier 210 or address for the present section.

If the present section is not the first section of the conveying system (NO, step 1112), then the present section controller acquires information from the prior section, step 1130. In particular information regarding the length of the next box/article to arrive. The present section controller based on the location of the articles/boxes on the section determines the room available on the present section to receive the next box/article to arrive. The present section controller then determines if there is room on the present section to take the next box/article to arrive, step 1132. If there is (YES), then the next box to arrive is transferred from the prior section to the present section, step 1134. This is accomplished by the controller of the present and prior sections transmitting index and ready messages to each other and allowing the box/article to continue moving along with the moving belts. The present section controller also updates its data table 200 with the data/information for the box that just arrived, step 1122.

Figure 5D:
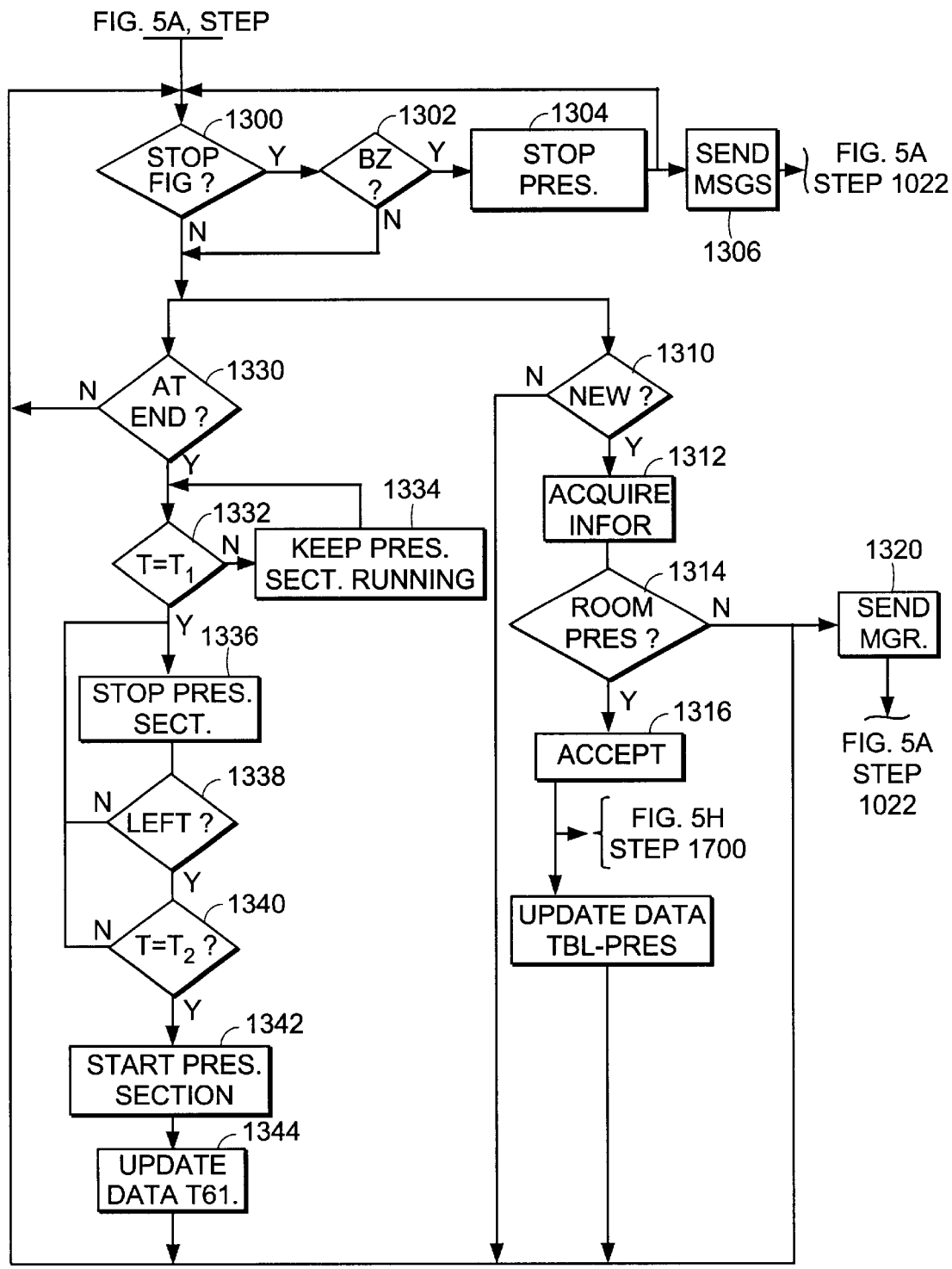
Figure 5E:
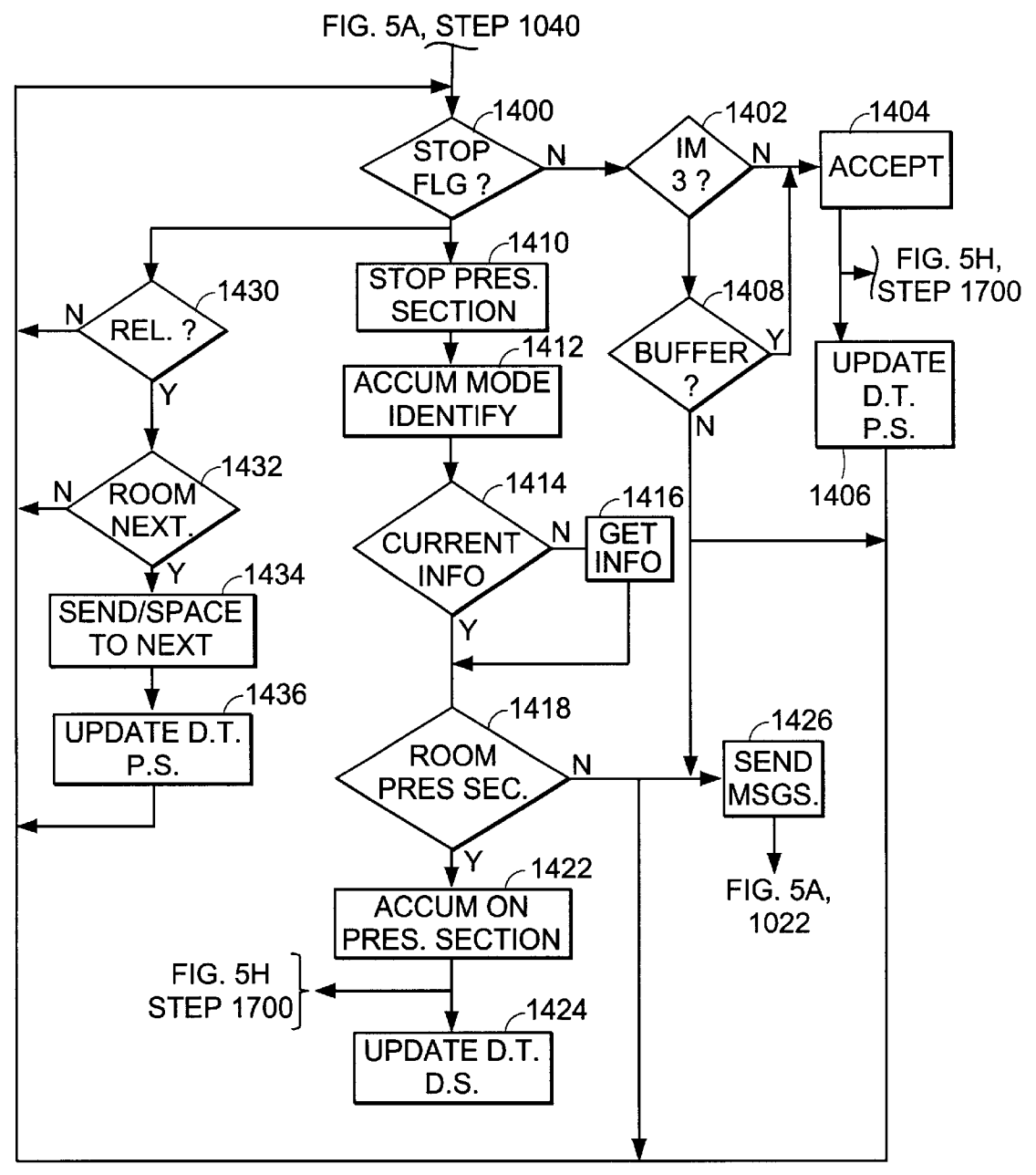
Figure 5F:
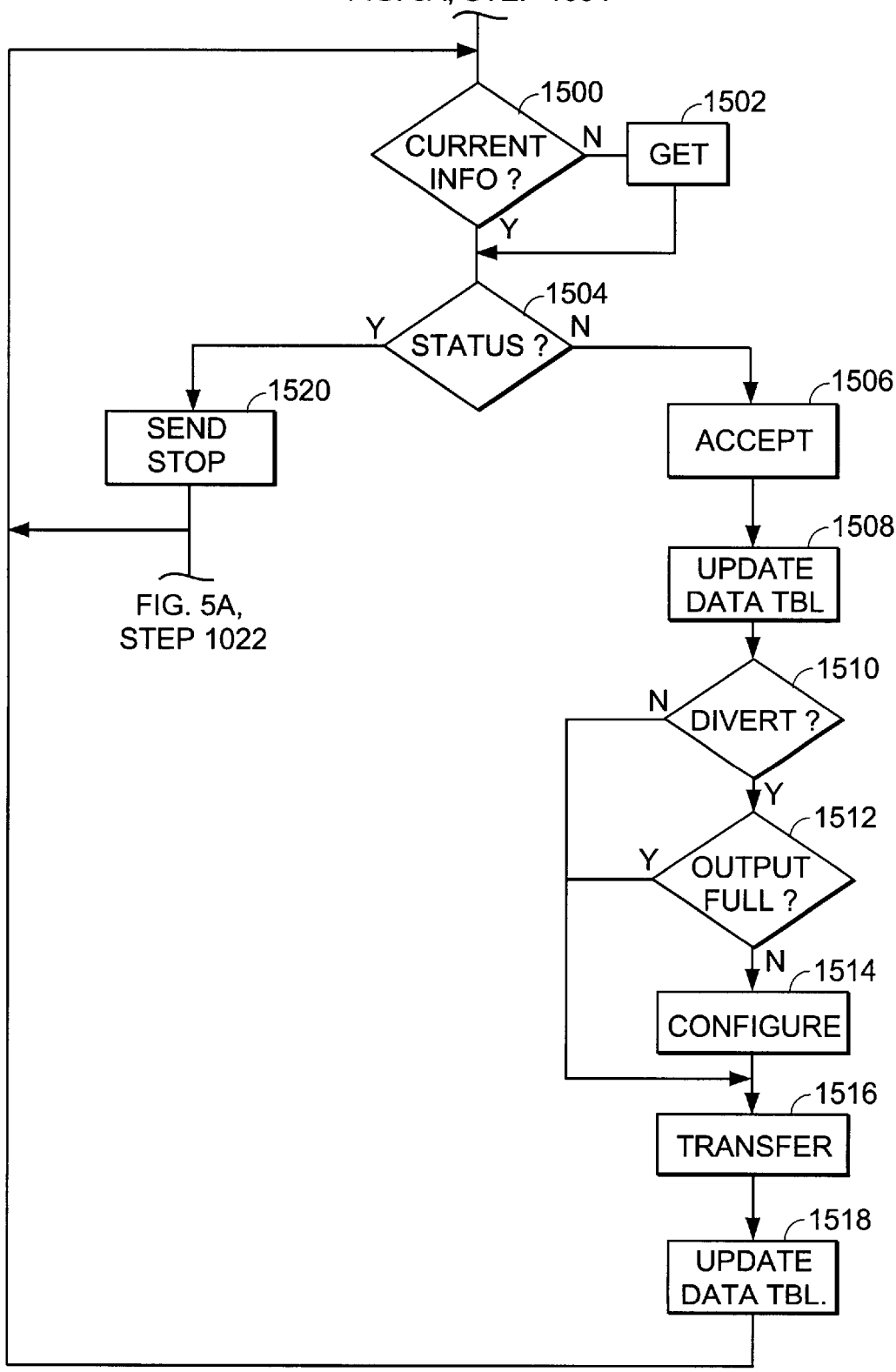
Figure 5G:
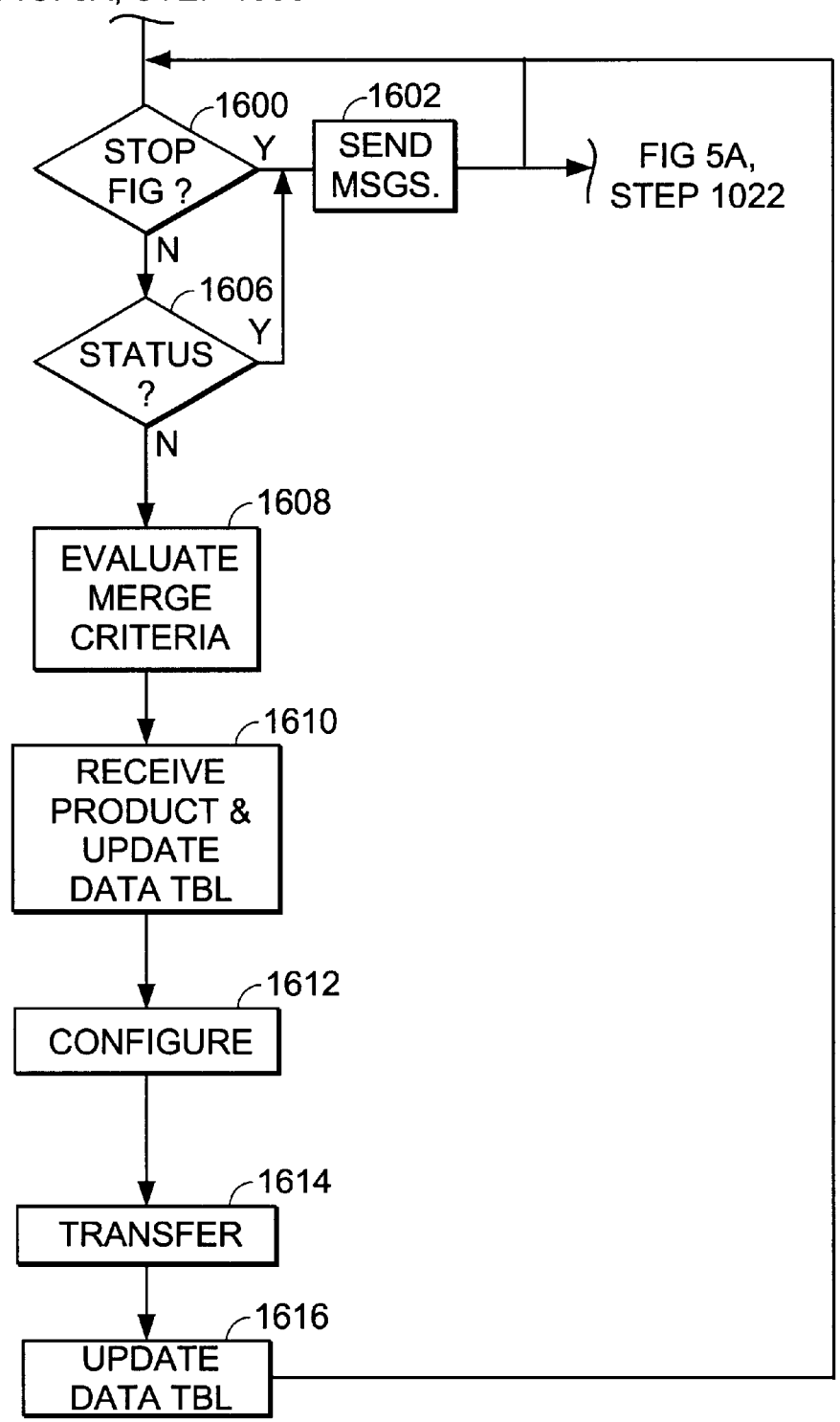
Figure 5H:
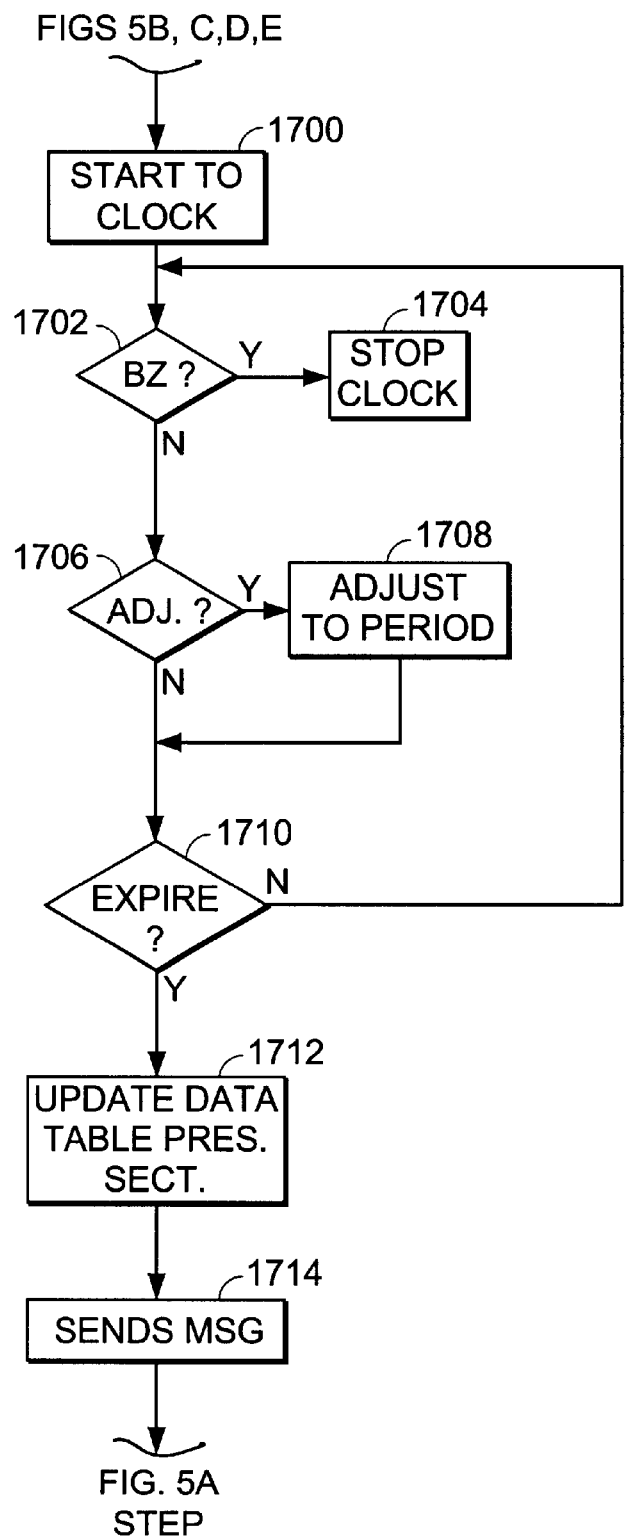

After each box enters onto the present section, whether it is the first or a straight section, the present section controller also starts an elapsed travel time tracking process, step 1700 (FIG. 5H). Using this process, the present section controller keeps track of the elapsed time from entry of each box/article on the present section. This is used as a means for determining if any box/article did not arrive at the end of the present section and thus removed from the present section. In this way, the present section controller can determine if a box/article was removed from the present section. For further details concerning this time out tracking process, reference should be made to the discussion below regarding FIG. 5H.

If there is insufficient room on the present section to receive the next box/article to arrive (NO, step 1132), then the present section controller sends a stop message to the prior section and a ready message to the next section, steps 1136, 1022 (FIG. 5A). After determining there is insufficient room (NO, step 1132) or after updating the data table (step 1122), the process returns to the beginning of the control routine for the present section, step 1100.

As noted above, the present section controller 10 controls the passage of goods through the present section and onto the next section. Whiled doing this, the present section controller continuously evaluates the location of boxes/articles in transit on the present section, step 1140. The present controller also, as it determines the location of the boxes/articles in transit, causes the locational information in the present section data table 200 to be updated accordingly.

The present section controller 10 evaluates the locational information to determine if an in-transit box/article is located in the buffer zone, step 1142. This buffer zone determination is preferably done by comparing the time that has elapsed since the box entered the present section with the time required to traverse the present section. The traversal time is adjusted by the present section controller to account for transport delays such as when stopping the present section. If the present section controller determines that the leading edge of the box/article is in the buffer zone (YES) then the controller sends out a ready message to the next section to indicate that a box is available for transfer, steps 1144, 1022 (FIG. 5A).

The present and next sections communicate with each other following the ready message transmission to determine if there is room on the next section for the box/article to be transferred, step 1146. Similar to the above described present section available room determination of step 1132, the next section determines if there is room available on the next section is sufficient to handle the length of the box/article, step 1146. If there is sufficient room (YES), then the box is sent to the next section and information from the present section data table is communicated to the next section for inclusion in the next section data table, step 1148. The present section data table also is updated to delete the information, when the box/article is transferred, step 1122. It should be noted that there may be other section specific criteria that preclude the next section from taking the box/article form the present section even though there physically may be sufficient room at the front end of the next section (e.g., box in next section buffer zone).

If there are boxes/articles in the conveying system be routed by means of route tags 208 in the data table 200, then the present section controller also evaluates the routing tags to determine if the present section is one of the section addresses identified as being a routing tag. If yes, then the present section controller sends a message back to the host computer 8 to indicate that the box/article has passed through a tagged location/address. Also, when the next section data table is updated the address of the present section is not included with the listing of routing tags or addresses (i.e., present section address removed from listing). Thus, the number of routing tags listed and tracked is reduced as the box/article successively passes through each identified section address.

If there is insufficient room on the next section to receive the box/article from the present section (NO, step 1146), then the present section controller stops the present section, step 1150 (i.e stops flow of boxes/articles). Also, the present section controller 10 sends a ready message to the next section, step 1152 & step 1022 (FIG. 5A). If the present section is not the first section 102 of a conveying system, then the present section controller also sends a stop message to the prior section. After stopping the present section, the process then returns to the beginning of the control routine for the present section, step 1002.

Referring next to FIG. 5C, there is shown the control routine of a controller when configured so a section of the conveying system, the present section, functions as an indexing section 108 (YES, step 1032, FIG. 5A). There are a number of conveying sections, such as the incline/decline, diverter and merge sections 110, 112, 114, where proper operation of that conveying section involves controlling or timing the entry of a box/article onto that section. The index section operates as a stop and go type of section, where a box is stopped and then sent on to the next section when it is appropriate. In this way, the downstream section/module operates properly, thereby minimizing the potential for damage to the boxes on the conveying system as well as to the individual sections of the system.

In operation, the present section controller 10 determines if the stop flag has been set, step 1200. If the stop flag is set (YES), then the controller evaluates the location of the articles in transit on the present section to determine if there is an article located in the buffer zone at the end of the present section, step 1202. If an article is located in the buffer zone (YES), then the present section controller stops the present section, step 1204. It should be noted, this is done irrespective of the indexing criteria for the present section. Also, the present section controller sends a ready and shop messages respectively to the next and prior sections, step 1206 & step 1022 (FIG. 5A). After stopping the present section, the process returns to the beginning of the control routine for the present section, step 1200.

If the stop flag is not set (NO, step 1200) or there is no article in the buffer zone when the stop flag is set (NO, step 1202), then the present section controller performs three functions as and when called upon. Specifically, the present section controller controls the entry of goods onto the present section, controls the stopping of in-transit goods at preselected locations of the present section and controls the release of the stopped goods onto the next section.

As provided in the foregoing, the conveying system 101 preferably is configured with a tracking device 122 at the front end of the present section to provide a positive indication of the arrival of goods (e.g., box, article) at the section's front end. Thus, the present section controller 10 monitors the tracking device and/or outputs signals from the prior section (e.g., a ready message) for purposes of determining the presence of a box/article next to arrive, step 1210. If a new box/article is ready for transfer (YES), then the present section controller acquires information from the prior section, step 1212. In particular information regarding the length of the next box/article to arrive.

The present section controller, as described above, determines the room available on the present section and whether the available room is sufficient for the next box/article to arrive, step 1214. If there is sufficient room (YES), then the box/article is transferred from the prior section to the present section, step 1216 and the data table 200 for the present section is updated with the data/information for that box/article, step 1218. The present section controller also starts an elapsed travel time tracking process, step 1700 (FIG. 5H) following receipt of the box/article that is discussed below.

If there is insufficient room on the present section to receive the next box/article to arrive (NO, step 1214), then the present section controller sends stop and ready messages respectively to the prior and next sections, step 1220 & step 1022 (FIG. 5A). After determining the available room is insufficient (NO, step 1220) or after updating the data table (step 1218), the process returns to the beginning of the control routine for the present section, step 1200.

As indicated above, the present section controller 10 also determines if the motion of a box/article along the present section should be stopped for indexing, step 1230. Typically, when a box on the present section is determined to have arrived at a set location, an indexing location, the box is stopped unless the next section is ready to receive it. The indexing location is a variable that is programmed by the user for a given application. For example, the end of an index section (i.e., the buffer zone) or some other intermediate location could be specified as the indexing location. If the motion of the box(es) on the present section should continue, (NO, step 1230) then the process returns to the beginning of the control routine for the present section, step 1200.

The box in transit can be stopped at an indexing location based on using any of a number of criteria or methods. For example, the present section controller could be configured so the present section is stopped after a present count of boxes passes through the section. The present section also could be stopped based on tracking information (e.g., routing information) in the data table or based on a switch input (e.g., photo-eye). If a box/article should be stopped at an indexing location (YES, step 1230), then the controller stops the present section, step 1232. As indicated above, stopping a section involves lifting the section's plurality of elongated pneumatic lifting assemblies so the box(es) on the section are lifted out of contact from the moving belt(s).

The present section, using the bi-directional communications link with the prior section, also sends a stop message to the prior section, step 1234. The prior section using the control routine specific to it, determines if and when to stop the prior section. After stopping the present section, the process returns to the beginning of the control routine for the present section (i.e., step 1200).

If a box/article is already stopped at an indexing location, as a result of steps 1230, 1232, then the present section controller determines if it is time to release the box/article to the next section, step 1240. There are a number of techniques that can be used to determine when a box should be released and which are typically dependent upon the type of section or module which follows the present section. For example, when the present section precedes an incline/decline section 110, the package is released from the indexing location so it will arrive on the incline section between two sets of lugs.

The present section controller 10 also can be configured to be responsive to actuation signals from manually operated switches. Thus, when a manual switch is activated, the box is released to the next section. For example, an indexing location can conform to the work station of an individual. Thus, after the work is performed, the worker would actuate a switch so the article would be released so it can travel to the next work station and/or next section. The present section controller 10 also can be configured to release an article/box after receiving an actuation signal from a manual switch and an actuation signal from another release control mechanism (e.g., timer). Further, while a single indexing location per section is described, a controller can be configured so a section includes a plurality of such indexing locations.

In sum, an article held up on an indexing section may be released manually and/or automatically. The article may be released automatically based on elapsed time, count, and ready signals from the next section. It should be recognized that the release criteria described herein is exemplary and any criteria or technique consistent with the intent and purpose of the present invention may be used.

If the box or article should be released to the next section (YES, step 1240), then the present section is started, step 1242. As indicated above starting a section involves lowering the elongated lifting assemblies so the article(s)/box(es) on the present section contact the moving belt. The article/box is then transferred onto the next section and the data table 200 of the present section is updated (i.e., deleting information concerning the transferred box), steps 1244, 1246.

If the address of the present section is one of the specified route tags 208, then the present section controller 10 also sends out a message to the host computer 8 indicating the article has passed through a specified route tag, step 1248, step 1022 (FIG. 5A). Thereafter, the process returns to the beginning of the control routine for the index section, step 1200.

Referring next to FIG. 5D, there is shown the control routine of a controller 10 when configured so a section of the conveying system, the present section, functions as a spacer section 116 (YES, step 1038, FIG. 5A). In conveying systems, the in-transit boxes/articles preferably are spaced from each other to avoid damage to the boxes/articles as they move through the system. Spacing of boxes/articles also allows them to be clearly diverted or merged by a diverter on merge section. Separation also makes it easier to identify a box/article as it passes over a tracking device. The spacer section 116 is a stop and go type of section that controls the spacing of boxes/articles as they are passed onto the next section. Preferably, the spacing provided by a spacer section is adjustable by the user.

As similarly described above for an index section 108 (i.e., see FIG. 5C), in operation the present section controller determines if the stop flag is set, step 1300 and, if so (YES), whether a box/article is in the buffer zone, step 1302. If an article is located in the buffer zone (YES), then the present section controller stops the present section, step 1304 and outputs ready and stop messages respectively to the next and prior sections step 1306 & step 1022 (FIG. 5A). After the present section is stopped (step 1304), the process returns to the beginning of the control routine for the present section, step 1300.

If the stop flag is not set (NO, step 1300) or there is no article in the buffer zone when the stop flag is set (NO, step 1302), then the present section controller 10 performs two functions as and when called upon. Specifically, the present section controller 10 controls the entry of goods onto the present section and it controls the release of the goods onto the next section so they are spaced from each other.

As described in the foregoing discussion concerning FIG. 5C, a tracking device 122 preferably is located at the front of the present section to provide a positive indication of a box/article being at the section's front end. Also as described in the foregoing, the present section controller 10 monitors for the presence of a box/article at the front end (step 1310), acquires information regarding the box/article to be transferred (step 1312) and determines if there is room on the present section for the box/article (step 1314).

If there is sufficient room (YES, step 1314), then the box/article is accepted (step 1316), the present section data table is updated (step 1318) and the elapsed travel time tracking process is started, step 1700 (FIG. 5H). If there is insufficient room (NO, step 1314), then the present section controller sends stop and ready messages respectively to the prior section and next sections, step 1320 & step 1022 (FIG. 5A). After determining there is insufficient room or after updating the data table (steps 1314, 1318), the process returns to the beginning of the control routine for the present section, step 1300.

For the box spacing process, the present section controller determines if a box is ready to leave the section, step 1330. Preferably, a tracking device 122 is located between the present and next sections, so there is a positive indication of the presence of a box at the end of the present section. That is the tracking device outputs a box present signal to the controllers of the present and next sections. However, the present section controller also can determine if the box is at the end of the present section based on the elapsed travel time of the box on the present section. If there is no box located at the end of the present section (NO, step 1330) then the process returns to the beginning of the control routine for the present section, step 1300.

If a box is located at the end of the present section (YES, step 1330), then the present section continues to run for a user set time $T_1$, a first time interval, steps 1332,1334. This ensures that most of the box has traveled off the lifting assembly of the present section and onto the dead zone between the present and next sections. Alternatively, the present section controller can determine a first time interval $T_1$ for each box/article by using the stored length of the box/article and the travel speed of the belts.

When the first time interval $T_1$ is exceeded (YES, step 1332), the present section controller stops the present section, step 1336 while the next section continues to run. The present section remains stopped, until after the box is determined to have left the present section, step 1338 and until after an additional time period, a second time interval $T_2$ is determined to have elapsed, step 1340. After the second time interval $T_2$ has elapsed (YES, step 1340), the present section is re-started, step 1342 by lowering of the section's lifting assemblies. In this way, the boxes going onto the next section are spaced from each other.

Further, the data table 200 of the present section is updated by deleting the information concerning the box that left, step 1344. As also discussed in the foregoing, if the present section is one of the identified addresses for a route tag, then the present section controller 10 also sends a message back to the host computer 8 that the box has passed therethrough. Thereafter, the process returns to the beginning of the control routine for the present section, step 1300.

When a tracking device 122 is located between the present and next sections, the present section controller 10 determines the box has left the present section when it loses the box present signal from the tracking device. The first and second time intervals are user set parameters, where the second time interval can be in the range of zero to the time for traveling the length of the present section.

Referring next to FIG. 5E, there is shown the section control routine when the programmed configuration parameters configure the controller 10 so the present section functions as an accumulation section 106 (YES, step 1040, FIG. 5A). A conveying system is commonly required to accumulate product moving therethrough at various points along the length of the system. The reasons for doing this include accommodating for consistent throughput for an automated process and/or accommodating for the peaks and troughs of product throughput. Generally, this involves temporary storage of product, for example, during the peaks, which is then released progressively when allowed.

For an accumulating section of the instant invention, the section runs continuously, until its controller 10 determines that the section should be operated in one of its pre-programmed accumulation modes. Accumulation of product is accomplished by lifting the product clear of the continuously moving belts, using the elongated lifting assemblies, thereby stopping movement of the product (i.e., also referred to as stopping the present section). In a one embodiment, the control routine for the controller 10 of an accumulation section includes three basic and user selectable modes to control the accumulation and movement of product.

In operation, the present section controller 10 determines if the stop flag has been set, step 1400. If the stop flag is not set (NO), then the controller determines if the present section is to operate in the third accumulation mode, step 1402. If not configured for operation in the third accumulation mode (NO), then the present section controller accepts the box next to be received, step 1404 and updates its data table 200, step 1406. In this condition, the present section controller functions similar to a straight section in passing through product and transferring it onto the next section.

If the present section controller is configured to operate in the third accumulation mode (YES, step 1402), then the controller determines if the first box/article on the section is within the buffer distance set for the present section, step 1408. If yes (YES), then the present section continues to run as well as accepting product (step 1404) and updating the data table (step 1406). If the first box is outside the set buffer distance (NO, step 1408), then the present section controller sends a stop message to the prior section, step 1426 & step 1022 (FIG. 5A) and returns the process to the beginning of the control routine, step 1400. Although a stop message is transmitted to the prior section, the present section continues to run so product thereon can be transferred onto the next section.

If the stop flag is set (YES, step 1400) indicating that the next section is stopped, then the present section controller stops the present section, step 1410 and identifies which accumulation mode (e.g., modes 1–3) the present section is to emulate, step 1412. Based on the operating mode determined by the foregoing steps 1402, 1412, the present section controller 10 determines if it has current information regarding the box/article next to arrive from the prior section, step 1414. If not (NO), the present section controller acquires the information from the prior section using the bi-directional communications link between the sections, step 1416.

If the present section has current information (YES, step 1414) or has acquired the information (step 1416), the controller determines if there is sufficient room on the present section to accumulate the next arriving box/article, step 1418. If there is sufficient room (YES), then the present section controller 10 operates the present section so as to accumulates product onto the present section, step 1422. The present section controller also causes its data table 200 to be updated with information concerning the box/article added thereto, step 1424. The present section controller also starts the elapsed travel time tracking process, step 1700 (FIG. 5H) following receipt of the box/article.

If there is insufficient room on the present section to receive the next box/article to arrive (NO, step 1418), then the present section controller sends stop and ready messages respectively to the prior and next sections, step 1426 & step 1022 (FIG. 5A). After determining there is insufficient room (NO, step 1418) or after updating the data table (steps 1406,1424), the process returns to the beginning of the control routine for the present section, step 1400.

The following describes the process followed by the present section controller for each of the three accumulation modes of the present section. In two of the operating modes, the present section runs continuously, transporting product from one end of the section to the other. When the stop command of the next section is received by the present section (i.e., stop flag set), the present section immediately stops and the control routine begins to accumulate product on the present section. In the third operating mode accumulation actions are taken by the present section controller to prevent large gaps between boxes/articles on the present and prior sections.

For one operating mode, when the present section is put into the accumulation mode after receiving a stop message from the next section, its controller checks for available space-ahead of the box/article (i.e. first box) closest to the next section. The available space is determined from the following relationship, where B is the length of the present section, $P_1$ is the distance between the front of the present section and the leading edge of the first box, and S, a user set parameter, represents product spacing.

$$\text{AVAILABLE SPACE} = B - (P_1 + S)$$

The present section controller 10 using information about the product next to receive, determines whether or not the present section has room to accept the next product. If the present section controller does not have this information initially, it obtains this information from the prior section using the bi-directional communications link between the sections. The next product from the prior section is accepted if the length of the next product plus product spacing ("S" distance) is less than or equal to the available space.

If the product cannot be accepted from the prior section, then the present section remains stopped, a READY message is communicated to the next section and an STOP message is sent to the prior section. As product is transferred to the next section, the present section controller re-evaluates the space available on the present section and re-determines whether product can be accepted.

If the product on the prior section can be accepted by the present section, an INDEX message is sent to the prior section. The present section remains stopped until it receives a signal from the prior section indicating that a product is about to arrive at the present section such as that described above for a spacer section. When the present section receives this signal, it begins to run and continues running for a set time interval. The set time interval puts a sets space between the product on the present section (i.e., the "S" distance). After the time interval elapses, the present section is again stopped.

In a second operating mode, once the present section is put into the accumulation mode following receipt of the stop message, the present section controller checks for the total unoccupied length on the present section. The unoccupied length is determined from the following relationship, where B is the length of the present section, $L_i$ is the length of each box/product con the present section (i.e., the "first box"), and S, a user set parameter, that represents product spacing.

$$\text{UNOCCUPIED LENGTH} = B - \Sigma(L_i + S)$$

As described in the foregoing, the present section controller 10 using information about the product next to be received, determines whether or not the present section has room to accept the next product. The next product from the prior section is accepted if the length of the next product plus product spacing ("S" distance) is less than or equal to the total unoccupied length.

If the product cannot be accepted from the prior section, then the present section remains stopped, a READY message is communicated to the next section and an STOP message is sent to the prior section. As product is transferred to the next section, the present section controller re-evaluates the space available on the present section and re-determines whether product can be accepted from the prior section.

If the product on the prior section can be accepted by the present section, an INDEX message is sent to the prior section. The present section remains stopped until it receives a signal from the prior section indicating that a product is about to arrive at the present section such as that described above for a spacer section. When the present section receives this signal, it begins to run in the "thumper" mode where the product to be received is indexed onto the present section.

In the thumper mode, the controller 10 controls the lifting assemblies so they are inflated and deflated to cause a pulsing action. The pulsing action is designed to gently close the gap between product and also to prevent damage to the underside of the product. The on/off time of the pulsing action is set by the user and can be optimally set for the product traveling on the conveying system.

In contrast to the first operating mode, product is accumulated on the present section in the second operating mode until the controller determines the present section is essentially full. That is, the total unoccupied space on the present section is essentially zero or less than that required to accept the next product from the previous section. In the thumper mode, if product reaches the end of the present section before the section is full the forward motion of the product closest to the next section is stopped by the raised lifting assemblies of the next section. This allows the present section to be filled to capacity.

The present section runs in the thumper mode until a set time interval, representative of the distance between product ("S" distance) has elapsed after the product has left the previous section. The set time interval puts a sets space between the product on the present section (i.e., the "S" distance). After the time interval elapses, the present section is again stopped. Reference should be made to the foregoing discussion regarding the first accumulation operating mode for details regarding the transfer of product to the next section which is equally applicable to a controller using the thumper accumulation mode.

In the third operating mode, the present section controller is configured to evaluate the boxes/articles on the present section to determine if the first box/article is located inside a preset buffer distance from the beginning or front of the present section. If a box/article is located inside the buffer distance then the section continues to run and the process of accepting boxes from the prior section will continue (e.g. INDEX message will be sent to prior section). When the box/article moves outside the buffer distance, then present section continues to run. However, a stop message is sent to the prior section so as not to allow any more boxes/articles to move onto the present section. In this way, the present section controller prevents large gaps between boxes that cannot be closed up if and when the present section goes into accumulation. When this box goes onto the next section, the present section sends an index message to the prior section. Thus, the process of transferring product from the prior section to present section is re-started.

As with the other operating modes, when the present section controller receives a stop message from the next section the present section is stopped. Thereafter, the present section controller functions like the first above described operating mode.

When in the accumulation mode product is transferred from the present section to the next section, when the next section can receive another box/article and there is room on the next section for the box/article ready for transfer. As such, the present section controller monitors the bi-directional communications link for messages (i.e., INDEX messages) indicating that the first box in the present section can be released, step 1430. If the box/article is releasable (YES) then the next section determines whether there is sufficient room for the box/article to be transferred to the next based on information obtained from the present section data table, step 1432.

If there is sufficient room (YES, step 1432), then the present section controller causes the box/article to be sent onto the next section and causes the information relating thereto to be communicated to the next section controller, step 1434. Further, the present section controller also causes the present section data table to be updated (i.e., to delete the related information), step 1436. Thereafter, as well as when there is insufficient room (NO, step 1432) or the box/article cannot be released (NO, step 1430), the process returns to the beginning of the control routine for the present section (step 1400).

Preferably, the present section controller also controls the transfer of product so the boxes/articles being transferred onto the next section are spaced from each other. The spacing function performed is similar to that performed by a spacer section. Specifically, the present section runs until a preset time interval $T_1$ has elapsed after the present section controller receives a "box present" signal from a tracking device 122 between the two sections. This ensures that most of the product has travelled off the prior section and onto the "dead zone" between the two sections. The present section is stopped while the next section continues to run thereby spacing the product out on the next section. After an second time interval $T_2$ has elapsed following the product leaving the section, the signal preventing the present section from running is removed.

Referring next to FIG. 5F, there is shown the section control routine when the programmed configuration parameters configure the controller 10 so the present section functions as a diverter section 112 (YES, step 1034, FIG. 5A). For the conveying system of the instant invention, product traveling along one line can be distributed into two lines using a diverter section 112 applying one of any number of sorting/diverting criteria. For example, the controller of the diverter section 112 can be configured to distribute the product based on routing information (i.e., the route tags), the length of the product based on data table input, switch input based on an evaluation of some other physical characteristic of the product (i.e, height, width, weight) and based on count (e.g., divert every other box). The controller 10 of the diverter section 112 also may be configured to operate in a specified fashion if one of the output lines is blocked/full.

The diverter section 112 includes a plurality of rollers that are mounted on a frame which can be selectively raised or lowered. When the frame is raised, the rollers lift the product off the moving belts and act on the product so as to cause it to change its direction of flow or movement. For example, the rollers cause, the product to make a 90° left turn with respect to the original direction of flow. When the frame is lowered, the rollers are disposed below the surface of the moving belts. As such, the product remains in contact with the moving belts and passes through the diverter section 112. As such, in one arrangement product passes through the diverter section 112 to one of the output lines and in another arrangement, the diverter's rollers causes the product to change direction so it enters another line.

Preferably, the diverter section 112 is preceded by an index section 108 as illustrated in FIG. 3. The index section 108 is used to control the arrival time of the product on the diverter section. As such, the diverter section 112 preferably is actuated on the expected arrival time of the product. Alternatively, the preceding section may be configured with a sensing mechanism, such a photoelectric eye, that actuates the diverter section after a preset time delay has elapsed. The preceding section also is operated to hold or retain the product thereon, when the diverter section 112 cannot accept the product next to arrive.

In operation, the present section controller 10 (i.e., the controller for the diverter section) determines if it has current information about the next product to arrive, step 1500. If not (NO), then the present section obtains this information from the prior section using the bi-directional communications link between the sections, step 1502.

Thereafter, the controller 10 performs a status check to see if there is product already being diverted, that is, is there product already on the present section 112, step 1504. The present section controller 10 also checks to see if both of the output lines are full. Alternatively, the present section controller 10 can be configured so it checks the output line for the next product to arrive to see if this line is full. Typically this is accomplished by determining if stop messages had been previously communicated to the present section controller 10 by the controllers for the next sections.

If no product is being diverted, and/or the output lines are not full, (NO, step 1504) then the present section accepts the product next to arrive from the prior section, step 1506. The present section controller 10 also causes the present section data table to be updated with the information concerning the accepted product, step 1508.

If there is product on the present section, and/or both output lines are full (YES, step 1504), then the present section controller 10 sends a stop message to the prior section, step 1520 & step 1022 (FIG. 5A). Thereafter, the process returns to the beginning of the section specific functional control routine, step 1500. As indicated above, the prior section is operated so it is stopped and the product is held thereon, when a stop message is sent by the present section controller 10. It is within the skill of one knowledgeable in the art, to appropriately configure the present section controller 10 for use with other diverter mechanisms or methodologies.

If product can be accepted (YES, step 1506), then the present section controller 10 determines the routing requirement for the product next to arrive, step 1510. Specifically, the present section controller 10 determines if the product is to be diverted or passed through the present section to the appropriate output line. If the product next to arrive, is to be diverted (YES), then the present section controller 10 determines if the divert output line is full, step 1512. This is accomplished using the bi-directional communication links established between the controllers of the present section and the next section in the divert output line.

If the divert output line is not full (YES), then the controller 10 configures the present section (i.e., raise rollers) at the appropriate time, step 1514. The product is then transferred to the divert output line, step 1516. The present section remains running in the configured arrangement for a set time interval "s" after the product left the prior section. Once the time interval has expired, the process returns to the beginning of the control routine (step 1500). Typically, the present section also is operated so the rollers remain disposed below the surface of the moving belts except when the product is to be redirected into the divert output line.

A conveying system typically is arranged to include a path for recirculating product back to the beginning of a diverter section so system operation is not adversely affected (i.e., stopped) if the divert output line is temporarily full. In these situations, the product is passed straight through a diverter section. As such, the present section controller 10 includes an override diversion criteria that forces the product to be routed in a specific manner if the divert output line is full, regardless of the requirement to divert the product. Thus, if the divert output line is full (YES, step 1512), then the product is passed straight through the present section and transferred directly into an output line, step 1516. Similarly, the product is passed straight through and transferred to the output line, when the product is not to be diverted (NO, step 1510). In this condition, the rollers of the present section are not raised, but rather remain in the down or lowered position.

As with the other sections of the conveying system, the data table 200 of the present section is updated to delete the data from the present section data table, step 1518 concerning the product being sent onto the next section of either output line. If the present section is being controlled based on routing information in the data table, then as part of the updating process an informational message is sent by the present section controller 10 back to the host computer 8 that the product has passed through one of the route tags.

Referring next to FIG. 5G, there is shown the section control routine when the programmed configuration parameters configure the controller 10 so the present section functions as a merge section 114 (YES, step 1036 FIG. 5A). For the conveying system of the instant invention, product traveling along two lines can be merged into one output line using a merge section 114 that applies any of a number or merging techniques/criteria. For example, the controller 10 for a merge section 114 can be configured the product that first arrives is the first through the merge section 114. Alternatively, the controller could be configured so priority is given to one line when product arrives at the same time in both input lines. For either technique, the merge section thereafter alternating receives product from the two input lines. In yet another technique, a batch of product (e.g., five boxes) is released from one line and then a batch is released from the other line.

The merge section 114 includes a plurality of rollers that are mounted on a frame so that they can be selectively raised or lowered. When raised, the rollers lift the product of the moving belts and act on the product on the merge section causing it to change its direction of flow or movement. When the rollers are lowered, the product remains in contact with the moving belts. As such, in one arrangement product passes through the merge section 114 from one input line directly to the output line and in another arrangement, the merge section causes the product from the other input line to be re-directed into the output line.

Preferably, the merge section 114 is preceded by an index section 108 in each input line as illustrated in FIG. 3. The index sections are used to control the arrival of product from each input line. This keeps product from the input lines separate to avoid collisions as well as controlling the product's time of arrival on the merge section. As such, the merge section 114 of the instant invention is actuated on the expected arrival time of the product from one of input lines on the merge section. Alternatively, the preceding section of each input lines may be configured with sensing mechanisms, such as a photoelectric eye as an input to the present section controller for determining which input line should send product and when to actuate the merge section.

In operation, the present section controller 10 (i.e., the merge section's controller) determines if the stop flag has been set, step 1600. If the stop flag is set (YES), then the controller 10 stops the prior sections by sending stop messages to the prior sections, step 1602, step 1022 (FIG. 5A). The process then returns to the beginning of the control routine for the present section (step 1600).

If the stop flag is not set (NO, step 1600), then the present section controller performs a status check to see if there is product already being merged, that is, is there product on the present section, step 1606. If there is product on the present section (YES), then the present section controller sends a stop message to the controller of the prior section in each input line, step 1604, step 1022 (FIG. 5A). The product next to arrive from both input lines is held on the prior sections until the present section can accept product for merger and transfer onto the next section.

If there is no product on the merge section 114 is empty (NO, step 1606), then the present section goes through the process of determining which input line to accept product from. The merging process is dependent upon the particular merge criterion/technique to be implemented by the present section controller. As such, the controller obtains information from the prior sections of the two input lines and evaluates this against the merge criterion being implemented, step 1608. Preferably, the control routine includes the instructions and criteria for selectively implementing either of two merge techniques, the priority merge technique and the batch merge technique.

Using the technique specific instructions and criteria, the present section controller controls the merge section, as well as the prior sections of the two input lines, so product is correctly received from one of the input lines, step 1610. At the same time the present section controller 10 causes the data table 200 of the present section to be updated with the information concerning the received product. In addition, the controller configures the present section (i.e., rollers raised or kept lowered) at the proper time, so the product being received will be in the proper position for transfer onto the next section, step 1612.

After the present section is appropriately configured by the present section controller, the product is merged by the present section and transferred onto the next section in the output line, step 1614. When the product is transferred onto the next section, the present section data table 200 is updated to reflect the departed product (i.e. information deleted), step 1616. Thereafter, the process returns to the beginning of the control routine for the present section (step 1600).

The following briefly discusses how the forgoing steps are accomplished when using one of the above referenced merge techniques. In the priority merge technique, the present section controller 10 determines which of the two input lines has priority. If the priority line is, for example, input line #1 then the present section controller determines if there is product at the end of the prior section for line #1. This can be determined by a signal from a tracking device 122 at the end of the prior section of line #1 or by a signal from the controller of this prior section indicating that the product is located in the buffer zone for that section. The present section controller also determines if there is product ready to leave input line #2. If there also is product at the end of line #2, then the present section controller sends out a STOP command message to the controller for the prior section in line #2.

The present section controller then configures the present section to receive and merge product from line #1 and to transfer it onto the next section. For example, if line #1 is in line with the outlet line, then the rollers of the present section are left in, or are put in, the down position. The product passes through the present section on the moving belts common to the present section, the prior section in line #1 and the next section.

When the product is transferred to the next section, the present section data table is updated to reflect the departure of the product therefrom. Additionally, if the present section is one of the identified addresses for a route tag, the present section controller outputs a message to the host computer 8 as described in the foregoing.

If there is no product ready on line #1, the present section controller determines if there is product at the end of line #2. If yes, then a check is made to see if product has not just arrived at the end of line #1. If there is product now at the end of line #1, the present section controller sends a stop message to the controller for the prior section of line #1, thereby stopping the product from departing line #1.

The present section controller then configures the present section to receive and merge product from line #2 and to transfer it onto the next section. For example, if line #2 is the angled input line, then the rollers of the present section are raised or put in the up position, at the time the product is expected to arrive on the present section. The rollers are operated to change the direction of the product as it passes through the present section. The rollers are then lowered so the product contacts the moving belts and can move onto the next section. As with the above described process for line #1, the present section data table 200 is updated to reflect the product leaving the present section.

To ensure a space between successively received products, the present section controller also does not allow the present section to accept more product until after a set time interval has elapsed after the product left the present section.

In the batch merge technique, a batch of product is passed through the present section from one input line while product is held-up or accumulated in the second input line. Thereafter, a batch of product from the second line then passes through the present section while product is held-up or accumulated in the first line. This process repeats itself. In all other respects, the process described above for the priority merge is equally applicable for the batch merge technique.

In the foregoing discussions concerning FIGS. 5B–5E, the respective control routines being described provided that an elapsed travel time tracking process was initiated by the present section controller 10 as each box/article entered onto the present section. Referring next to FIG. 5H, there is shown the control routine for the elapsed time tracking process that is used to determine if any box/article was physically removed from the present section before reaching the section's end point. This is done so the tracking of boxes/articles by each section and the operation of the conveying system is not adversely affected by such a removal.

As indicated in the foregoing discussion, as each box/article enters onto a section, a time out clock or clock routine is started 1700. It should be recognized that the present section controller 10 may use the clock means of the controller's central processing unit 26, or another clock circuit or device, as known to those skilled in the art, to develop the repetitive signal pulses used to track/determine elapsed time.

The present section controller 10, using the positional information determined by signals from a tracking device 122, determines if a box/article is located in a buffer zone of the present section, step 1702. If the box is in the buffer zone (YES), then the time out clock is stopped for this box, step 1704. While the process describes the clock as being stopped for the box that is exiting the present section, the clock still runs for the boxes remaining on, or added to, the present section.

If the box is not in the buffer zone (NO, step 1702), then the controller determines if the preset time period for traveling the length of the present section should be adjusted, step 1706. As discussed above, the various sections comprising the conveying system may or may not be stopped for periods of time (i.e., motion of in-transit boxes/articles stopped). For example, when an accumulation section is the accumulation mode, the passage of each box through the accumulation section is delayed. As such, the preset time period is adjusted to account for these stoppages or time delays. If the preset period should be adjusted (YES), then the present section controller adjusts the preset travel time period in accordance with a set procedure, step 1708.

After adjusting the preset travel time period (step 1708) or if no adjustment is required (NO, step 1706), the present section controller determines if the elapsed time for each box exceeds the travel time period for passing through the present section, step 1710. If the preset travel time period is exceeded (YES), then the controller present section controller considers the box being tracked to have been removed from the present section. Accordingly, the present section controller updates the present section data table to delete the information regarding this box, step 1712 and does not communicate the information onto the next section. If the conveying system 101 is connected to a host computer 8, then the present section controller also sends an error message to the host computer using the controllers' communications network, step 1714 & step 1022 (FIG. 5A).

If the travel time period is not exceeded (NO, step 1710), then the above process is repeated for the box until the box is determined to have reached the end of the present section, step 1702 or the preset travel time period has expired, step 1710. As noted above this process is repeated for each box in the present section.

Figure 5I:
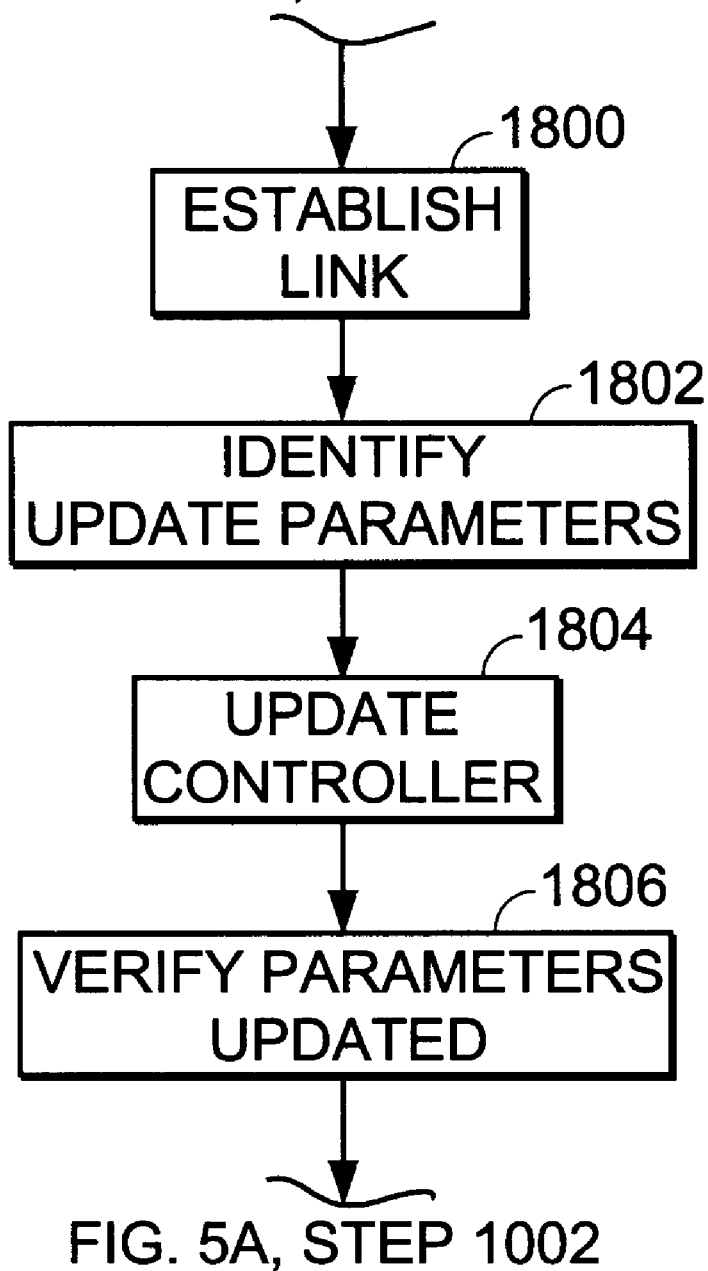

Referring next to FIG. 5I, there is shown the control routine for accessing the present section controller 10 for the initial programming or re-programming of the controller's configuration parameters using the bi-directional communications network. Preferably, the host computer 8 outputs a message to a controller 10 indicating that it to be programmed/re-programmed (YES, step 1004 FIG. 5A).

To program or re-program the configuration parameters, a link is established between the host computer 8 and the controller to be programmed/re-programmed, step 1800. This typically involves the transmission of acknowledgement messages between the host computer 8 and the controller 10 over the communications network 100.

The host computer 8 then transmits the parameters to the present section controller 10 that are initially being set therein or that are being updated or changed, step 1802. For example, when initially configuring the controller 10 for a straight section 104, the host computer would communicate information concerning the section type (e.g., 1 for a straight section), the length of the section, the time taken to travel the length of the section, the next section address, the prior section address, the size of the buffer zone, and parameters relating to route tagging. Whereas, for example, for updating/re-programming it may change one of the configuration parameters (e.g., the size of the buffer zone).

The controller 10 takes the transmitted information and stores it in the NVRAM 22, step 1804. The controller 10 and host computer 8 then undertake a process to verify that the parameters have been properly updated/set, step 1806. Thereafter, the present section controller returns to monitoring the bi-directional communications network for messages directed to its address, step 1002 (FIG. 5A).

As noted above, each controller also may be initially configured or updated using the RS232 I/O port 20. In operation, the process for programming the controller using the I/O port 20 is similar to that described above.

While a preferred embodiment of the invention has been described using specific terms, such description is for illustrative purposes only, and it is to be understood that changes and variations may be made without departing from the spirit or scope of the following claims.

What is claimed is:

1. A device controller for each device of a plurality of devices to be controlled, the device controller for said each device comprising:

at least one bi-directional inflow port;
at least one bi-directional outflow port:
a processor that processes information and provides outputs, where at least one output controls said each device;
an applications program for execution within the processor, wherein the applications program includes instructions and criteria for processing information and providing the processor outputs; and
wherein the instructions and criteria of the applications program includes:
  instructions and criteria for communicating information among and between the device controller for each of said plurality of devices using one of the at least one bi-directional inflow port and the at least one bi-directional outflow port of the device controller for each pair of said plurality of devices,
  instructions and criteria for processing information being communicated to the device controller of said each device, and
  instructions and criteria for modifying the operation of said each device responsive to the communicated information.

2. The device controller of claim 1, further comprising a read/write memory for storing data and parameters that control the operation of the applications program and wherein the applications program further includes instructions and criteria for controlling data storage in the read/write memory.

3. The device controller of claim 1, wherein the applications program further includes instructions and criteria for real time tracking of data.

4. The device controller of claim 1, wherein the applications program further includes instructions and criteria for reprogramming the processor by means of instructions and information communicated to the processor through one bi-directional inflow port.

5. The device controller of claim 1, further comprising at least two bi-directional outflow ports and at least two bi-directional inflow ports.

6. The device controller of claim 5, wherein one bi-directional inflow port of the device controller for each of two of said plurality of devices are each linked to the two bi-directional outflow ports of the device controller for said each device and wherein the applications program further includes instructions and criteria for selectively communicating information from the device controller of said each device to the device controller for one of said two plurality of devices.

7. The device controller of claim 5, wherein one bi-directional outflow port of the device controller for each of two of said plurality of devices are each linked to the two bi-directional inflow ports of the device controller for said each device and wherein the applications program further includes instructions and criteria for selectively communicating information from the device controller of said each device to the device controller for one of said two plurality of devices.

8. The device controller of claim 5, wherein the applications program further includes instructions and criteria for selectively communicating information through one of the two bi-directional inflow ports or one of the two bi-directional outflow ports to another device controller of said each pair of plurality of devices.

9. A system comprising a plurality of device controllers, one device controller for each device to be controlled,
wherein each of the plurality of device controllers comprises:

at least one bi-directional inflow port, at least one bi-directional outflow port, a processor that processes information and provides outputs, where at least one output controls said each device, and an applications program for execution within the processor, wherein the applications program includes instructions and criteria for processing information and providing the processor outputs;

wherein a communications link is established between each pair of the plurality of device controllers by interconnecting one bi-directional outflow port of one device controller of said each pair to one bi-directional inflow port of the other device controller of said each pair; and wherein the instructions and criteria of the applications program includes:

instructions and criteria for communicating information among and between the plurality of device controllers using the communications link between the bi-directional inflow and outflow ports of each said pair, instructions and criteria for processing information communicated to the device controller for said each device, and instructions and criteria for modifying the operation of said each device responsive to the communicated information.

10. The system of claim 9, wherein each of the plurality of device controllers further comprises a read/write memory for storing data and parameters that control the operation of the applications program and wherein the applications program further includes instructions and criteria for controlling data storage in the read/write memory.

11. The system of claim 9, wherein the communications link is established between said each pair by electrically interconnecting the bi-directional outflow port to the bi-directional inflow port.

12. The system of claim 9, wherein the applications program further includes instructions and criteria for real time tracking of data.

13. The system of claim 9, wherein the applications program further includes instructions and criteria for reprogramming the processor by means of instructions and information communicated to the processor through one bi-directional inflow port.

14. The system of claim 9, wherein each of the plurality of device controllers further comprises at least two bi-directional outflow ports and at least two bi-directional inflow ports.

15. The device controller of claim 14, wherein the applications program further includes instructions and criteria for selectively communicating information through one of the two bi-directional inflow ports or one of the two bi-directional outflow ports to another device controller of said each pair.

16. A system comprising:

a plurality of device controllers;

a plurality of devices, where there is one device controller for each device of said plurality of devices, wherein each of the plurality of device controllers comprises:

at least one bi-directional inflow port, at least one bi-directional outflow port, a processor that processes information and provides outputs, where at least one output controls said each device, and an applications program for execution within the processor, wherein the applications program includes instructions and criteria for processing information and providing the processor outputs;

wherein a communications link is established between each pair of the plurality of device controllers by interconnecting one bi-directional outflow port of one device controller of said each pair to one bi-directional inflow port of the other device controller of said each pair; and wherein the instructions and criteria of the applications program includes:

instructions and criteria for communicating information among and between the plurality of device controllers using the communications link between the bi-directional inflow and outflow ports of each said pair, instructions and criteria for processing information communicated to the device controller for said each device, and instructions and criteria for modifying the operation of said each device responsive to the communicated information.

17. The system of claim 16, wherein the communications link is established between said each pair by electrically interconnecting the bi-directional outflow port to the bi-directional inflow port.

18. The system of claim 16, wherein the applications program further includes instructions and criteria for reprogramming the processor by means of instructions and information communicated to the processor through one bi-directional inflow port.

19. The system of claim 16, wherein each of the plurality of device controllers further comprises at least two bi-directional outflow ports and at least two bi-directional inflow ports.

20. The system of claim 19, wherein the applications program further includes instructions and criteria for selectively communicating information through one of the two bi-directional inflow ports or one of the two bi-directional outflow ports to another device controller of said each pair.

* * * * *